United States Patent
Zafar

(10) Patent No.: US 12,155,742 B1
(45) Date of Patent: Nov. 26, 2024

(54) SYSTEMS AND METHODS FOR MITIGATING TIME SYNCHRONIZATION LATENCY IN COMPUTER NETWORKS

(71) Applicant: Winchester Global Trust Company Limited a/t/o Elusio Trust, Hamilton (BM)

(72) Inventor: Fawad Zafar, London (GB)

(73) Assignee: Winchester Global Trust Company Limited a/t/o Elusio Trust, Hamilton (BM)

( * ) Notice: Subject to any disclaimer, the term of this patent is extended or adjusted under 35 U.S.C. 154(b) by 0 days.

(21) Appl. No.: 18/667,839

(22) Filed: May 17, 2024

(51) Int. Cl.
*H04L 7/00* (2006.01)
*H04J 3/06* (2006.01)
*H04L 7/02* (2006.01)

(52) U.S. Cl.
CPC .......... *H04L 7/0016* (2013.01); *H04J 3/0661* (2013.01); *H04L 7/02* (2013.01)

(58) Field of Classification Search
None
See application file for complete search history.

(56) References Cited

U.S. PATENT DOCUMENTS

| | | | |
|---|---|---|---|
| 9,236,967 B1 * | 1/2016 | Mustiere | H04J 3/0667 |
| 11,792,299 B1 * | 10/2023 | Bshara | H04J 3/0682 |
| | | | 709/226 |
| 2009/0276542 A1 * | 11/2009 | Aweya | H04J 3/0667 |
| | | | 709/248 |
| 2015/0071308 A1 * | 3/2015 | Webb, III | H04W 56/0035 |
| | | | 370/503 |
| 2016/0359914 A1 * | 12/2016 | Deen | H04J 3/14 |
| 2018/0145863 A1 * | 5/2018 | Chaloupka | H04L 67/01 |

* cited by examiner

*Primary Examiner* — Anh Vu H Ly
(74) *Attorney, Agent, or Firm* — Foley & Lardner LLP

(57) ABSTRACT

Systems and methods for improvements to the time synchronization within computer networks and applications that rely on time synchronization and/or time series data. In particular, the systems and methods provide improved time synchronization for computer hardware and/or software through the use of supplemental signal data received with a time stamp (or time stamped data). The supplemental signal data describes current network conditions. The systems and methods may then use this supplemental signal data for a signal control scheme that adjust a received time stamp and/or selects from a plurality of available time stamps. Moreover, the systems and methods may receive various types of supplemental signal data and may select how the various types effect the signal control scheme in a given scenario.

20 Claims, 9 Drawing Sheets

| Current Phase | St2 | | | | | | | |
|---|---|---|---|---|---|---|---|---|
| | ph1 | ph2 | ph3 | ph4 | ph5 | ph6 | ph7 | ph8 |
| Buy | 1 | 0 | 0 | 0 | 0 | 0 | 0 | 0 |
| Sell | 0 | 1 | 0 | 0 | 0 | 0 | 0 | 0 |
| Repo | 0 | 0 | 1 | 0 | 0 | 0 | 0 | 0 |
| Call | 0 | 0 | 0 | 1 | 0 | 0 | 0 | 0 |
| Put | 0 | 0 | 0 | 0 | 1 | 0 | 0 | 0 |
| Bond | 0 | 0 | 0 | 0 | 0 | 1 | 0 | 0 |
| Interest | 0 | 0 | 0 | 0 | 0 | 0 | 1 | 0 |
| Tax | 0 | 0 | 0 | 0 | 0 | 0 | 0 | 1 |

```
300
import time
class Transaction:
    def __init__(self, transaction_id, amount):
        self.transaction_id = transaction_id
        self.amount = amount
class TDMMultiplexer:
    def __init__(self, time_slot_duration):
        self.time_slot_duration = time_slot_duration
        self.transactions = []

def add_transaction(self, transaction):
        self.transactions.append(transaction)
    def run_tdm(self):
        current_time = 0
        while self.transactions:
            for transaction in self.transactions[:]:
                if current_time % self.time_slot_duration == 0:
                    print(f"Transaction ID: {transaction.transaction_id}, Amount: ${transaction.amount}")
                    self.transactions.remove(transaction)
            time.sleep(1)
            current_time += 1
if __name__ == "__main__":
    multiplexer = TDMMultiplexer(time_slot_duration=5)
    # Adding sample financial transactions
    transaction1 = Transaction(transaction_id=1, amount=1000)
    transaction2 = Transaction(transaction_id=2, amount=1500)
    transaction3 = Transaction(transaction_id=3, amount=2000)
    multiplexer.add_transaction(transaction1)
    multiplexer.add_transaction(transaction2)
    multiplexer.add_transaction(transaction3)
    # Run the TDM algorithm
    multiplexer.run_tdm()
```

FIG. 3A

```
import time                                  350
import ntplib
class Transaction:
    def __init__(self, transaction_id, amount, timestamp=None):
        self.transaction_id = transaction_id
        self.amount = amount
        self.timestamp = timestamp if timestamp else self.get_current_time()

def get_current_time(self):
        client = ntplib.NTPClient()
        response = client.request('pool.ntp.org', version=3)
        return response.tx_time class AtomicTimeMultiplexer:
    def __init__(self):
        self.transactions = []

def add_transaction(self, transaction):
        self.transactions.append(transaction)

def run_atomic_time_transmission(self):
        for transaction in self.transactions:
            print(f"Transaction ID: {transaction.transaction_id}, Amount: ${transaction.amount}, Timestamp: {transaction.timestamp}")
            time.sleep(1)

if __name__ == "__main__":
    multiplexer = AtomicTimeMultiplexer()

# Adding sample financial transactions
    transaction1 = Transaction(transaction_id=1, amount=1000)
    transaction2 = Transaction(transaction_id=2, amount=1500)
    transaction3 = Transaction(transaction_id=3, amount=2000)

multiplexer.add_transaction(transaction1)
    multiplexer.add_transaction(transaction2)
    multiplexer.add_transaction(transaction3)

# Run the atomic time transmission algorithm
    multiplexer.run_atomic_time_transmission()
```

```python
import pandas as pd
import numpy as np
import time

# Define a function to generate random data with timestamps
def generate_data():
    timestamp = pd.Timestamp.now()  # Current timestamp
    value = np.random.randint(1, 100)  # Random value
    return timestamp, value

# Initialize an empty DataFrame to store temporal data
temporal_data = pd.DataFrame(columns=['Timestamp', 'Value'])

# Define a function to update temporal data and tags dynamically
def update_temporal_data():
    while True:
        timestamp, value = generate_data()  # Generate new data
        new_row = pd.DataFrame({'Timestamp': [timestamp], 'Value': [value]})
        temporal_data = temporal_data.append(new_row, ignore_index=True)

# Append new data to DataFrame
        # Update temporal tags or perform adaptive analysis here
        print("Updated temporal data:", temporal_data)  # Print updated temporal data
        time.sleep(1)  # Sleep for 1 second before generating next data point

# Run the function to continuously update temporal data
update_temporal_data()
```

FIG. 3C

450
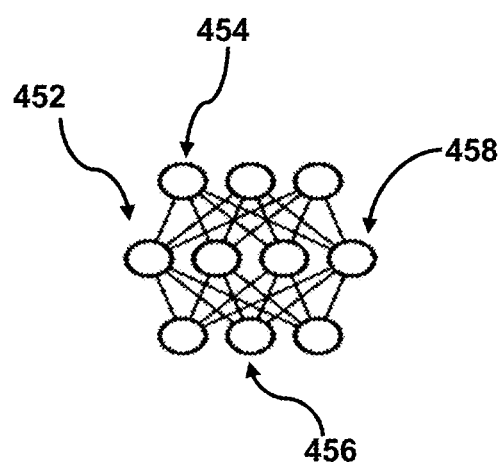
470
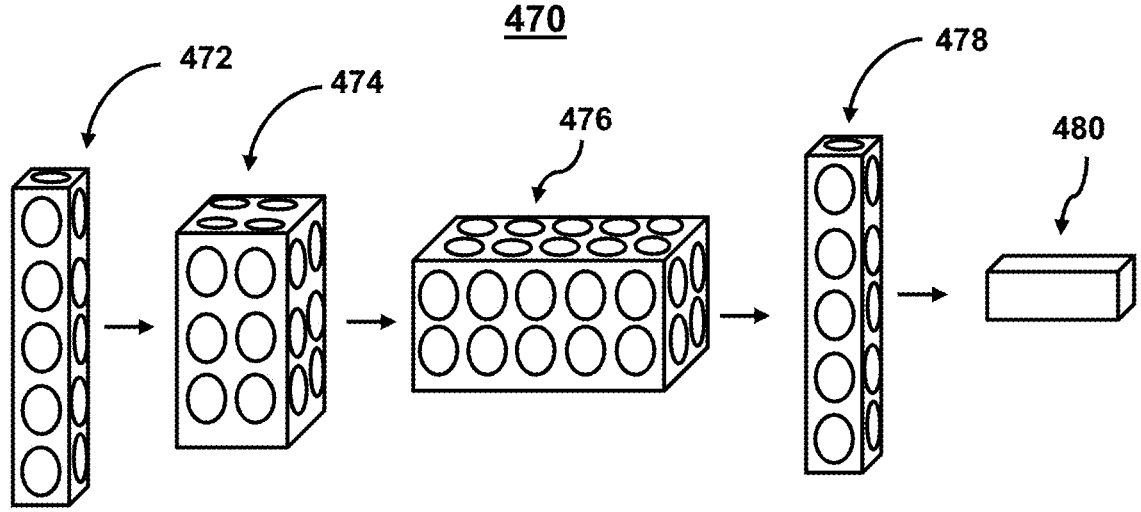
FIG. 4B

SYSTEMS AND METHODS FOR MITIGATING TIME SYNCHRONIZATION LATENCY IN COMPUTER NETWORKS

BACKGROUND

A timestamp is a sequence of characters or encoded information identifying when a certain event happened, usually giving date and time of day, sometimes accurate to a small fraction of a second. In computing and telecommunications, timestamps are crucial for maintaining accurate and consistent records across various systems and platforms. They are commonly used in logging events, database management, and for documenting when data entries or transactions are made. Timestamps help in troubleshooting by providing a chronological order of events, in synchronization by ensuring that operations are carried out in the intended sequence, and in data consistency by marking when data was accessed or modified. Different formats can be used to represent timestamps, such as the widely-used ISO 8601 standard, which combines date and time information in a format that is both human-readable and easy to parse in software. Timestamps are fundamental in systems where the accuracy and order of events are crucial, such as financial transactions, network logs, and real-time communication systems.

Time series data is a sequence of data points collected at, correlated to, and/or recorded at a specific time instance. Each data point in the series typically consists of a timestamp and one or more values corresponding to that timestamp. This type of data is essential in various fields such as finance, meteorology, economics, and health care because it helps analyze trends, cycles, and patterns over time. For instance, in finance, time series data might track the daily closing prices of a stock, while in meteorology, it could record hourly weather conditions. The consistent interval between each data point is crucial as it allows for meaningful comparison and forecasting based on historical data.

Time stamps may be based on a measurement of time. Time may be measured by observing periodic events that occur at regular intervals, known as time standards. Historically, the rotation of the Earth on its axis provided a natural time standard, leading to the division of the day into 24 hours. Modern timekeeping, however, relies on atomic clocks, which measure time based on the constant frequency of microwave radiation emitted by electrons in cesium atoms as they change energy levels. This method is extraordinarily precise, leading to the definition of the second in the International System of Units (SI) as the duration of 9,192,631,770 periods of the radiation corresponding to the transition between two energy levels of the cesium-133 atom. Time measured in this way forms the basis for Coordinated Universal Time (UTC), which synchronizes timekeeping globally. Additional adjustments, such as leap seconds, are occasionally made to account for slight variations in Earth's rotation and keep atomic time aligned with solar time.

SUMMARY

Despite the high level of precision and accuracy in modern timekeeping, modern applications continue to require even more precise and/or accurate mechanisms for time keeping. Moreover, as the need for precision and/or accuracy increases, delays in receive a measurement of a global synchronized time can create its own latency issues with the precision and/or accuracy. For example, while a globally synchronized time may be called at any point by a device in a computer network, issues related to various delay types within the network (e.g., propagation delays, transmission delays, processing delays, and/or queuing delays) may result in a time being unsynchronized when received. For example, propagation delay may be fundamental and unavoidable, and correlated to a distance a request and response for a synchronized time must travel, as it occurs as the data signal travels across a physical medium (such as copper cables, fiber optics, or airwaves) at a speed close to the speed of light. Transmission delays may depend on the data size and the bandwidth of the network. Data, even minutely small amounts such as a current globally synchronized time may take longer to transmit on networks with limited bandwidth. Processing delays may also occur at each node in a network (e.g., routers and switches) where data packets (e.g., comprising a globally synchronized time) may be examined and routed to their destination and thus subject to delay in instances of complex routing rules or heavy traffic. Finally, queueing delays may happen when packets are held in a queue at a network node waiting to be processed or transmitted, which varies with the network's congestion level. Alone or together, these factors may create overall latency in a network, influencing the performance and responsiveness of networked systems and applications as well as the precision at which a received data packet indicating a globally synchronized time actually corresponds to the current globally synchronized time.

In view of the aforementioned technical challenges and problems, systems and methods are described herein for improvements to computer networks and their applications, specifically in the area of time synchronization. For example, the systems and methods are described herein for improvements to the time synchronization within computer networks and applications that rely on time synchronization and/or time series data. In particular, the systems and methods provide improved time synchronization for computer hardware and/or software through the use of supplemental signal data received with a time stamp (or time stamped data). As opposed to relating to a characteristic of time, the supplemental signal data describes current network conditions. The systems and methods may then use this supplemental signal data for a signal control scheme that adjust a received time stamp and/or selects from a plurality of available time stamps. Moreover, the systems and methods may receive various types of supplemental signal data and may select how the various types effect the signal control scheme in a given scenario.

For example, the supplemental signal data may comprise a passive priority signal that is based on historical traffic data. The amount of historical traffic data in a network may reflect the likelihood of (or determine an amount of) transmission and/or processing delays. The system may thus adjust a received time stamp accordingly based on information provided by the passive priority signal. In another example, the supplemental signal data may comprise an active priority signal that is based on real-time bus communications (e.g., indicating an activity level of a given node with the computer network). The system may thus adjust a received time stamp accordingly in instances with heavy (or light) bus use. In yet another example, the supplemental signal data may comprise an adaptive priority signal based on real-time detected traffic flow data for signal timing optimization control. The detected traffic flow in a network may reflect the likelihood of (or determine an amount of) transmission and/or processing delays that may affect a time stamp.

The system may receive along with time stamped data a real-time stream comprising the supplemental signal data. Using this information, the system may determine how to adjust, intercept, and/or use time stamped data and/or the time stamps therein. For these determinations, the system may use a control scheme that comprises rules and routine for using supplemental signal data. For example, the passive priority signal may be dependent on the stability and/or accuracy of traffic demand and thus may not be selected by the system (or weighted as heavily) for time stamp adjustment in scenarios with real-time changing traffic demand. The active priority signal may be dependent on the number, frequency, and/or placement of buses within the computer network and thus may not be select by the system (or weighted as heavily) for time stamp adjustment in scenarios with unknown network architectures.

In some embodiments, the supplemental signal data may comprise temporal tags that indicate the temporal characteristics of the data (e.g., a level of latency, a data source, etc.) and/or a temporal relevance (e.g., how important the data is to a specific time frame). For example, the system may determine a time stamp for given information as well as a temporal tag for that information. The information, time stamp and/or temporal tag may be used by an application (e.g., an artificial intelligence model) to generate one or more recommendations. In some embodiments, the supplemental signal data may be used to for temporal tag embedding for dynamic information retrieval, meta-forecasting, and/or signal processing, which may consist of Frequency-Based Splitting, Windowing, Event-Based Splitting, Time-Frequency Analysis, and Dynamic Time Warping. For example, temporal tags may be included in information transmitted to and/or received from a given model or application in order to improve the model or application.

In some aspects, systems and methods for mitigating time synchronization latency in computer networks. For example, the system may receive, at a first computer network, a first data stream comprising time series data, wherein the time series data includes time stamps generated using a first time source. The system may determine, a first network condition, for the first computer network. The system may generate first supplemental signal data for the first computer network based on the first network condition. The system may retrieve a control scheme for interpreting the time stamps generated using the first time source based on the first supplemental signal data. The system may use the control scheme to generate annotated time series data based on the time series data. The system may generate a recommendation based on the annotated time series data.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIGS. 3A-C show an illustrative example of pseudocode used for determining supplemental signal data, in accordance with one or more embodiments.

FIG. 4B shows an artificial intelligence model architectures for using in one or more applications, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

Figure 1:
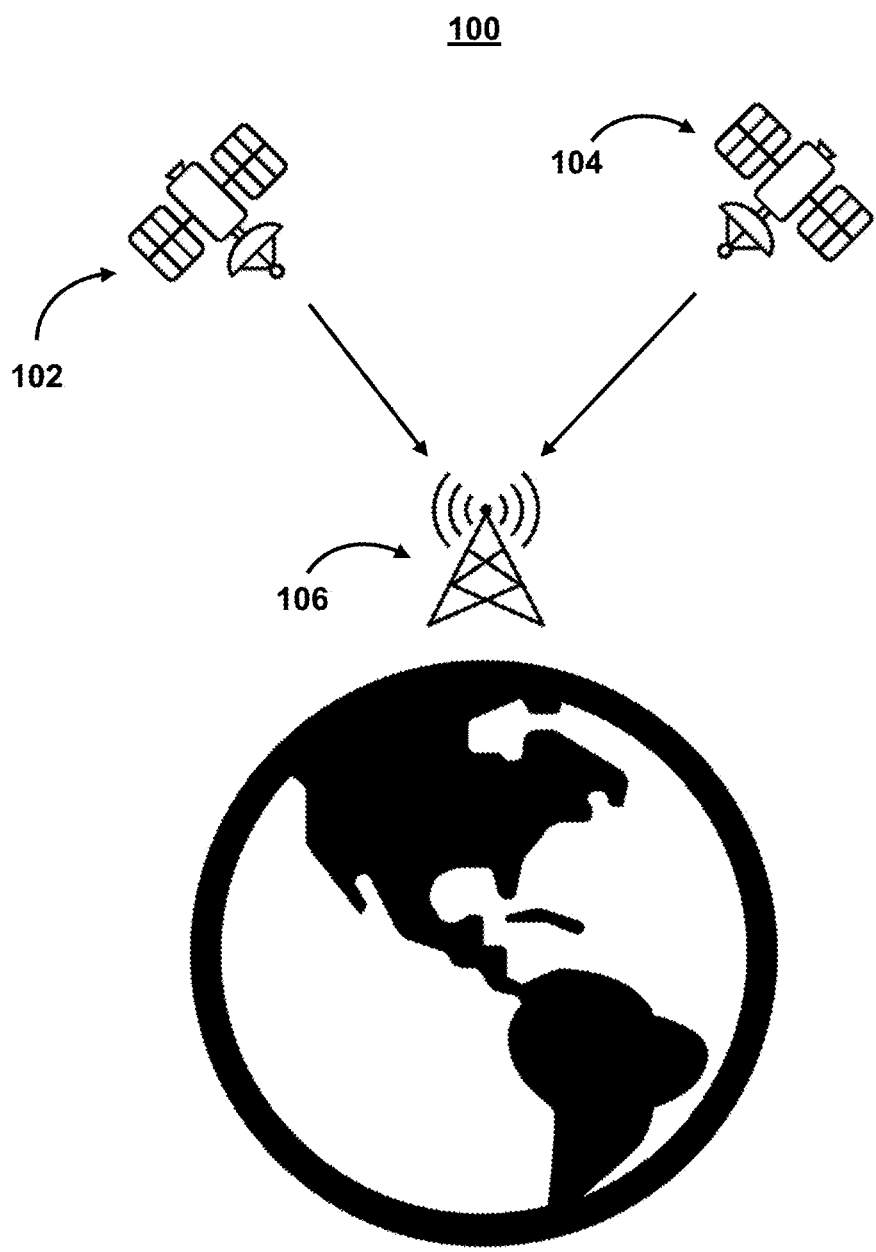
FIG. 1 shows an illustrative example of global time synchronization using satellites, in accordance with one or more embodiments.

FIG. 1 shows an illustrative example of global time synchronization using satellites, in accordance with one or more embodiments. For example, in some embodiments, satellites (e.g., satellite 102 and satellite 104) may be used to determine and distribute globally synchronized time, primarily through the use of the Global Positioning System (GPS) and other similar satellite navigation systems like GLONASS (Russia), Galileo (Europe), and BeiDou (China). These systems may maintain extremely precise atomic clocks on board their satellites, which are critical to their functionality.

For example, each satellite (e.g., satellite 102 and satellite 104) in systems like GPS contains multiple atomic clocks that keep time with extreme precision. These clocks measure time based on the vibrations of atoms under certain conditions, typically cesium or rubidium atoms, which are highly accurate. The satellites continuously broadcast time signals along with their location data to a receiver on earth (e.g., receiver 106). These signals are encoded with the precise time according to the satellite's atomic clock at the moment of transmission.

Devices on Earth (e.g., receiver 106) equipped with a GPS receiver (like smartphones, certain watches, and specialized GPS receivers) capture these time-coded signals from multiple satellites. By measuring the time delay between when these signals were sent and when they are received, the receiver (e.g., receiver 106) can calculate its distance from each satellite. To accurately synchronize time, the receiver adjusts for the delay caused by the signal's travel time from the satellite to Earth. The process involves using the signals from at least four satellites to solve equations that account for time and the receiver's location in three dimensions. The operation of GPS satellites also involves corrections based on the theory of relativity—General Relativity predicts that the satellite's clocks would tick faster than clocks on Earth due to their position in a weaker gravitational field, and Special Relativity predicts they would tick slower because they are moving relative to observers on Earth. The system corrects these differences to maintain accuracy. The globally synchronized time provided by satellite systems is crucial for various applications beyond navigation, including telecommunications, financial systems, power grid management, and scientific research, ensuring that operations are coordinated down to the millisecond or finer. This synchronization is integral to maintaining consistency across global networks.

Furthermore, when dealing with tasks involving temporal context, such as document retrieval or text generation, applications need take into account the relative time dilation experienced by different sources of information. This may affect the weighting or relevance assigned to documents or passages based on their temporal distance from the reference frame. For example, time dilation may influence the generation of text by adjusting the temporal context or perspective considered by the model, potentially leading to more nuanced and contextually relevant output. In signal processing tasks, for example, time dilation may affect the interpretation of temporal patterns and features in the signal data. For example, signals captured from objects in motion or gravitational fields may exhibit time dilation effects, leading to distortions or shifts in the observed temporal characteristics. Signal processing algorithms may need to account for time dilation effects when analyzing or interpreting signals in relativistic or gravitational environments, ensuring accurate estimation and prediction of signal behavior. For users relying on Global navigation satellite system (GNSS) systems for navigation (e.g., GPS in smartphones or navigation devices), the impact of time dilation is indirect but significant. Without proper correction for relativistic effects, GNSS positioning accuracy would degrade over time, leading to errors in navigation and positioning information provided to users. Temporal relevance also has effects in computer networks that do not rely (at least for navigation) on GPS. For example, in real-time systems or applications, such as financial trading platforms or emergency response systems, temporal relevance often refers to the immediacy or freshness of incoming data. Recent data is considered more temporally relevant than older data, and timely processing of information is crucial for making informed decisions or taking appropriate actions. In historical analysis or long-term forecasting tasks, temporal relevance may involve assessing the significance of past events or trends within a specific time period. Events that occurred closer to the present may be considered more temporally relevant for predicting future outcomes or understanding historical patterns. Temporal relevance also encompasses the idea of contextual awareness, where the importance of information is evaluated within the broader temporal context of a given situation or domain. For example, in natural language processing tasks, the relevance of textual information may depend on its temporal context within a conversation, document, or historical timeline. By embedding time-related features into the classification, resource allocation, and feedback mechanisms of the signal processing system, it is possible to create a dynamic and adaptive framework capable of efficiently processing signals based on their temporal relevance and importance. This approach enables timely response to critical signals while ensuring efficient utilization of computational resources.

Accordingly, systems and methods are described herein for improvements to computer networks and their applications, specifically in the area of time synchronization. Additionally or alternatively, systems and methods for temporal tag embedding for dynamic information retrieval, meta-forecasting, and signal processing are described. For example, the systems and methods provide these improvements by determining time relevance of data using supplemental signal data. For example, the systems and methods describe mechanisms for data representation, model architectures, model training, and/or generating model recommendations that account for this time relevance.

For example, during preprocessing, the system may identify time-related features in the dataset, such as timestamps or temporal contexts. The system may convert time-related features into a suitable format for input into an artificial intelligence model. This may involve encoding timestamps as numerical values, converting temporal contexts into embeddings, or using time-related metadata for document retrieval. The system may also modify the model architecture to accept input embeddings that include time-related features. This may involve adjusting the input layer or adding additional input channels to accommodate time embeddings. Additionally or alternatively, the system may incorporate mechanisms for temporal attention or temporal encoding within the model architecture to enable the model to focus on relevant time periods during retrieval or generation. The system may then train the model on the preprocessed dataset, including the embedded time-related features. The model may additionally fine-tune the model parameters to optimize performance for tasks involving temporal context, such as document retrieval or generation conditioned on time. During inference, the system may provide input data with embedded time-related features to the trained model. The system may use the model's retrieval capabilities to retrieve relevant documents or passages based on the provided time-related context. The system may generate text conditioned on both the retrieved content and the embedded time-related features, ensuring that the generated output is contextually relevant to the specified time period. Finally, the system may evaluate the performance of the model on tasks involving temporal context, such as document retrieval accuracy or the relevance of generated text. The system may then iterate on the model architecture, training process, and inference strategies based on evaluation results to improve performance and efficiency over time.

By accounting for time relevance, the systems and methods can gain numerous improvements. For example, the system may provide a classification model that may categorize incoming signals based on their temporal relevance. This may involve training a machine learning model to classify signals into priority, secondary, and tertiary categories based on time-related features, such as urgency, freshness, or time sensitivity (e.g., as shown in vector network 402 (FIG. 4A)). The system may embed time-related features into the input data used for classification, allowing the model to learn temporal patterns and relationships that influence signal prioritization. As another example, the system may provide a resource allocation mechanism that dynamically assigns processing resources based on the classification of incoming signals. Signals classified as a priority may be given higher processing priority and allocated more computational resources to ensure timely processing and response. The system may incorporate time-related information into the resource allocation algorithm to account for time dilation effects or temporal constraints. For example, signals from sources experiencing time dilation may be given adjusted processing deadlines to compensate for the observed time differences. As another example, the system may provide a parallel processing architecture capable of handling both priority and secondary (and tertiary) signal processing simultaneously. This could involve allocating separate processing units or threads for priority and secondary tasks to ensure efficient resource utilization and timely response to critical signals. The system may embed time-related features into the communication protocol or data structures used for inter-process communication, enabling efficient synchronization and coordination between parallel processing units while accounting for temporal differences. As yet another example, the system may provide a feedback mechanism that continuously monitors system performance and adjusts signal processing priorities based on real-time conditions. This involves reclassifying signals based on their evolving temporal relevance or dynamically reallocating resources to adapt to changing workload patterns. The system may use time-related feedback metrics, such as processing latency or deadline adherence, to evaluate system performance and optimize resource allocation strategies over time.

For example, by creating a priority system with primary, secondary, and tertiary levels for temporal tagging, the system may prioritize the most critical temporal metadata while providing additional context and information to support more comprehensive analysis and interpretation of temporal data. Examples of primary temporal tags include timestamps indicating the exact time when an event occurred, time intervals specifying the duration of an event or period, and validity periods indicating the time range during which data is considered valid. Secondary temporal tags represent the next level of priority and provide additional context or metadata that enhances the interpretation and analysis of temporal data. Examples of secondary temporal tags include temporal relevance scores indicating the importance or significance of data within a specific time frame, temporal constraints specifying constraints or conditions on data validity, and temporal relationships indicating temporal dependencies or associations between events. Tertiary temporal tags represent the lowest level of priority and provide supplementary information or metadata that may be relevant in certain contexts but is not critical for basic temporal organization or analysis. Examples of tertiary temporal tags include additional contextual information such as the source or origin of data, data quality metrics indicating the reliability or accuracy of data, and temporal annotations providing descriptive labels or categorizations of temporal data.

Figure 2:
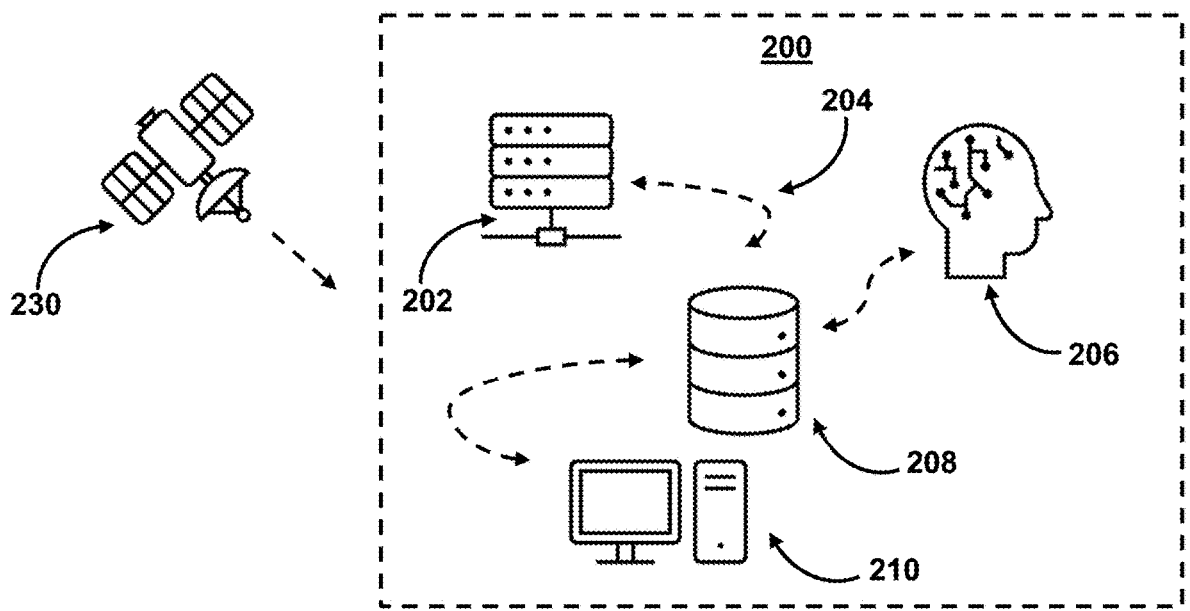
FIG. 2 shows an illustrative diagram for a system for mitigating time synchronization latency in computer networks, in accordance with one or more embodiments.

FIG. 2 shows an illustrative diagram for a system for mitigating time synchronization latency in computer networks, in accordance with one or more embodiments. For example, FIG. 2 may include computer network 200 and table 250. Computer network 200 may comprise various devices, components, and/or applications. For example, computer network 200 may comprise one or more networks that may also comprise numerous devices, components, and applications that facilitate the communication and operation of interconnected systems.

Computer network 200 may include networking devices. Networking devices (e.g., network device 202) such as routers, switches, and hubs are foundational, directing data traffic efficiently. Routers connect multiple networks, directing data packets between them, while switches connect devices within a single network segment, improving the network's efficiency by delivering data only to the intended recipient. Hubs are simpler, broadcasting incoming data packets to all connected devices, though they are less common now due to their inefficiency.

Computer network 200 may include transmission media. Transmission media are also critical, with choices between wired options like Ethernet cables (coaxial, twisted pair) and fiber optics, or wireless methods such as Wi-Fi and Bluetooth. Each medium has its pros and cons related to speed, security, and installation requirements. On the software side, network operating systems and network management software play key roles. These allow for the management of network resources, user administration, and ensure data security and proper network functionality. Firewalls and antivirus software help secure the network by blocking unauthorized access and detecting threats. End-user devices such as computers, smartphones, and IoT devices are the points of interaction for users within the network, while peripheral devices like printers and scanners provide additional functionality. Servers are powerful machines that store, send, and process data, hosting applications like email, databases, and websites. Lastly, specialized networking applications may be used for various tasks, including communication (e.g., email clients, messaging apps), resource planning (e.g., ERP software), and remote access (e.g., VPNs). These applications are designed to utilize network capabilities to perform tasks that are critical to business operations and personal communication. Collectively, these diverse components and applications enable the robust functionality of modern computer networks, supporting everything from simple file sharing to complex cloud computing environments.

Computer network 200 may include a user interface. As referred to herein, a "user interface" may comprise a human-computer interaction and communication in a device, and may include display screens, keyboards, a mouse, and the appearance of a desktop. For example, a user interface may comprise a way a user interacts with an application or a website. As shown in FIG. 2, computer network 200 may include user device 210 (which in some embodiments may correspond to a personal computer, a mobile device, and/or other computing device, including, but not limited to, a laptop computer, a tablet computer, a hand-held computer, other computer equipment (e.g., a server), including "smart," wireless, wearable, and/or mobile devices. FIG. 2 may also include one or more cloud components. Cloud components may alternatively be any computing device as described above and may include any type of mobile terminal, fixed terminal, or other device. For example, cloud components may be implemented as a cloud computing system and may feature one or more component devices. It should also be noted that computer network 200 is not limited to devices as shown. Users may, for instance, utilize one or more devices to interact with one another, one or more servers, or other components of computer network 200.

It should be noted that, while one or more operations are described herein as being performed by particular components of computer network 200, those operations may, in some embodiments, be performed by other components of computer network 200. As an example, while one or more operations are described herein as being performed by components of server 208, those operations may, in some embodiments, be performed by one or more cloud components. In some embodiments, the various computers and systems described herein may include one or more computing devices that are programmed to perform the described functions. Additionally, or alternatively, multiple users may interact with computer network 200 and/or one or more components of computer network 200. For example, in one embodiment, a first user and a second user may interact with computer network 200 using two different components.

With respect to the components of computer network 200, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data.

It should be noted that in some embodiments, the devices may have neither a user input interface nor displays and may instead receive and display content using another device (e.g., a dedicated display device such as a computer screen and/or a dedicated input device such as a remote control, mouse, voice input, etc.). Additionally, the devices in computer network 200 may run an application (or another suitable program). The application may cause the processors and/or control circuitry to perform operations related to recommending content. It should be noted that, although some embodiments are described herein specifically with respect to artificial intelligence models, other predictive, statistically-based analytical models may be used in lieu of or in addition to artificial intelligence models in other embodiments.

Each of these devices may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

Computer network 200 may also include a plurality of communication paths (e.g., communication path 204). Communication path 204 may include the internet, a mobile phone network, a mobile voice or data network (e.g., a 5G or LTE network), a cable network, a public switched telephone network, or other types of communication networks or combinations of communication networks. Communication path 204 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Computer network 200 also includes model 206. Model 206 may be a computer model that may be a digital simulation used to represent and analyze the behavior of real-world or theoretical systems through the use of algorithms and mathematical formulas. In some embodiments, model 206 may comprise an artificial intelligence model. An artificial intelligence model may be a computational structure designed to perform tasks that would normally require human intelligence. These tasks include reasoning, learning from past experiences, interpreting language, and making decisions. AI models are built using algorithms and data to train the model to recognize patterns, make predictions, or generate outputs based on inputs it has never seen before. The process involves feeding large amounts of data into the model, which it uses to learn and improve its accuracy over time through methods such as machine learning and deep learning.

As described herein, computer network 200 may receive a time stamp from an external source and/or receive data featuring a time stamp. For example, computer network 200 may receive a time stamp, data featuring a time stamp, and/or data used to determine a time stamp from source 230. To do so, computer network 200 may send a request for time stamped data and receive a response featuring time stamped data. For example, a client device (such as a computer or a mobile device), network component, and/or application may send a request over the network to a server or other device (e.g., source 230) that holds the desired time stamped data. This request is made using a specific application protocol, such as HTTP (Hypertext Transfer Protocol) for web services, or a specialized data access protocol like SQL (Structured Query Language) for databases. The request includes details about what data is needed and may specify conditions related to the timestamps of the data, such as data entries within a certain date and time range. A server (or other device), upon receiving the request, may process it through its server-side software, which may involve querying a database or accessing files that contain the required data. The server's system checks the timestamps associated with the data to determine which entries meet the criteria specified in the request. This involves reading metadata or directly accessing data structures where timestamps are stored alongside the data they correspond to.

Once the appropriate data has been identified and gathered, the server (or other device) packages it into a response message. This message is formatted according to the protocol being used, ensuring that it includes both the data requested and the relevant timestamps. The response also contains additional metadata if necessary, such as the status of the request and timestamps indicating when the response was generated. Finally, the server (or other device) sends the response back to the client over the network. The client receives the response, and software on the client side parses the data, extracting the time stamped information and possibly displaying it to the user or using it for further processing.

As the time stamped data, request, and/or responses traverses computer network 200, the time stamp data may encounter a delay. Due to the delay, the time stamped data may no longer be synchronized with a globally synchronized time. To overcome this, computer network 200 may use supplemental signal data received with a time stamp (or time stamped data) to maintain synchronization.

As described herein, supplemental signal data may be any data that describes the characteristics and/or conditions of a computer network. This data includes metrics on traffic flow, such as packet loss, latency, bandwidth usage, and throughput, which help in assessing the network's capacity and efficiency. It may also cover error rates that can indicate problems in data transmission or faulty network components. Furthermore, network condition data includes logs and alerts generated by network devices like routers, switches, and firewalls. These logs record events such as configuration changes, device status updates, and security incidents, providing insights into operational status and potential security vulnerabilities. Network performance indicators, such as response times and connection status may also be used.

Additionally, network condition data may encompass more advanced metrics derived from network analysis tools, such as network topology changes, quality of service (QoS) levels, and trends in network usage. This data is often visualized in network management systems, providing administrators with real-time and historical data necessary to make informed decisions about network adjustments, capacity planning, and to ensure compliance with service-level agreements (SLAs). Collectively, this data forms the backbone of network monitoring and management strategies, enabling proactive maintenance and optimization of the network to ensure it meets the demands of its users efficiently and reliably.

In some embodiments, network condition data may describe a particular component and/or be used to generate a particular type of supplemental signal data. For example, the supplemental signal data may comprise a passive priority signal that is based on historical traffic data. The amount of historical traffic data in a network may reflect the likelihood of (or determine an amount of) transmission and/or processing delays. The system may thus adjust a received time stamp accordingly based on information provided by the passive priority signal.

Historical traffic data for a computer network may refer to the recorded information about the network's data flow over a specific period. This data includes metrics such as the amount of data transmitted and received, the speed of data transfer, the sources and destinations of traffic, and the types of protocols used. Additional detailed statistics might cover packet loss rates, error rates, and latency measurements, which provide insights into the quality and efficiency of the network during the recorded periods. The determination of historical traffic data is typically achieved through network monitoring tools and software that continuously capture and log traffic at various points within the network. These tools use techniques such as packet sniffing, where packets are captured and analyzed to gather data about their size, timing, and header information. Network routers and switches can also contribute to data collection by maintaining logs of network activities, including the handling of data packets. Once collected, this data may be stored by the system in databases or data warehouses, where it can be queried, analyzed, and visualized. Network administrators may use this historical data for several critical functions, such as capacity planning, where they analyze past traffic patterns to predict future network needs and plan upgrades or expansions accordingly. It is also used for performance benchmarking, troubleshooting to identify the causes of past performance issues, and improving security by spotting unusual traffic patterns that could indicate cyber threats.

In another example, the supplemental signal data may comprise an active priority signal that is based on real-time bus communications (e.g., indicating an activity level of a given node with the computer network). The system may thus adjust a received time stamp accordingly in instances with heavy (or light) bus use. As described herein, a bus may refer to a communication system that transfers data between components inside a computer or between computers. This system is comprised of various pathways that allow different parts of a computer system to communicate with each other. There are several types of buses that are integral to a computer network such as a data bus (which carries the actual data among the processors, memory units, and peripheral devices), an address bus (which carries information about where the data needs to go or where it is being sent from), and/or a control bus (which carries control signals to coordinate various parts of the computer, including signals for coordination and timing).

Buses, which are channels for data transfer within and between computer components, provide essential data about the system's internal operations. For instance, system buses that connect the main components of a computer (like the CPU, memory, and storage devices) can relay information about data flow rates, access errors, and resource usage that are vital for assessing the system's performance and health. Network management systems utilize this information by collecting and analyzing data from various buses across networked devices. For example, a bus within a server can provide insights into memory utilization, processing load, or storage access patterns, which are key indicators of the server's current operational status. This data helps in identifying bottlenecks or failures in data processing and storage components that could impact network performance. Moreover, in more complex scenarios involving multiple networked computers and devices, administrators can deploy specialized software that aggregates data from the buses of different systems. This software analyzes patterns and trends, such as sudden spikes in CPU or memory usage that might indicate a cyber-attack or a failure in network hardware. The ongoing monitoring of these metrics allows network administrators to perform proactive maintenance, optimize system performance, and ensure high availability and reliability of network services. In addition, the real-time data collected from system buses aids in load balancing by distributing data processing and storage tasks across multiple servers based on their current load and performance metrics. This ensures that no single server becomes a bottleneck, thus maintaining smooth operation across the network.

In yet another example, the supplemental signal data may comprise an adaptive signal based on real-time detected traffic flow data for signal timing optimization control. The detected traffic flow in a network may reflect the likelihood of (or determine an amount of) transmission and/or processing delays that may affect a time stamp. Traffic flow in a computer network may refer to the movement and volume of data being transferred over the network at any given time. It encompasses the data packets traveling between devices, servers, and external networks, effectively representing the digital communication activity within the network.

Detecting traffic flow may be done through network monitoring tools and techniques such as packet sniffing and flow sensors. Packet sniffing involves capturing data packets as they pass through a particular point in the network to analyze their contents, sources, destinations, and other parameters. Flow sensors, integrated into network devices like routers and switches, track the volume and rate of data passing through, collecting detailed information about the traffic flow.

The current level of traffic flow may be a metric for determining network latency, which is the time it takes for a data packet to travel from its source to its destination. In practical terms, higher volumes of traffic can lead to congestion, just as more cars on a road can lead to slower travel times. When a network experiences high traffic volumes, data packets may take longer routes, wait in queues at routers, or be delayed during processing—all contributing to increased latency. By monitoring the current traffic flow, the system (e.g., model 206) can identify peak usage times and patterns of congestion. With this information, the system can implement strategies to manage latency, such as traffic shaping, which prioritizes certain types of traffic, and load balancing, which distributes traffic more evenly across the network.

In some embodiments, the supplemental signal data may comprise temporal tags that indicate the temporal characteristics of the data (e.g., a level of latency, a data source, etc.) and/or a temporal relevance (e.g., how important the data is to a specific time frame). For example, the system may determine a time stamp for given information as well as a temporal tag for that information. The information, time stamp and/or temporal tag may be used by an application (e.g., an artificial intelligence model) to generate one or more recommendations.

For example, a temporal tag may be a label or attribute associated with a data point (e.g., a datum of time series data) or other piece of information indicating its temporal properties or relevance. Temporal tags may provide additional context about the timing or temporal characteristics of the data, helping to organize, categorize, or interpret it within a temporal framework. Temporal tags may be used in organizing, indexing, and/or analyzing temporal data, enabling efficient search, retrieval, and analysis of data based on its temporal properties. For example, a model may use temporal tags to facilitate tasks such as time-series analysis, temporal querying, event detection, and/or trend forecasting by providing contextual information about the timing and temporal relationships within the data.

In some embodiments, the supplemental signal data may be used to for temporal tag embedding for dynamic information retrieval, meta-forecasting, and/or signal processing, which may consist of Frequency-Based Splitting, Windowing, Event-Based Splitting, Time-Frequency Analysis, and Dynamic Time Warping. Frequency-based splitting involves separating a signal into different frequency bands or ranges. This allows analysts to isolate specific components, identifying patterns and features relevant to particular applications, such as removing noise or identifying specific signal characteristics. Windowing is a method of segmenting a long signal into smaller, manageable chunks. By applying a window function, it emphasizes or minimizes parts of the signal within each segment, reducing spectral leakage. Event-based splitting partitions data streams by detecting and extracting specific events. Instead of fixed-length segments, this approach isolates data based on certain triggers or conditions, which can capture important variations and responses within the data that may align with real-world activities. Time-frequency analysis combines the principles of time-domain and frequency-domain analysis to evaluate how the frequency content of a signal evolves over time. Techniques like Short-Time Fourier Transform (STFT) and wavelet transforms are common, providing valuable insights into signals with time-varying frequencies. Dynamic time warping (DTW) is a technique used primarily to compare and align sequences that might vary in speed or timing. By calculating an optimal alignment path, DTW allows for the comparison of patterns in signals that have different time scales, which is particularly useful in speech and activity recognition where different instances of a signal may vary significantly.

A temporal tag may include information related to a time stamp, time interval, temporal attributes, and/or temporal relevance. Temporal tags include timestamps indicating the exact time when a data point was recorded, observed, or generated. For example, time stamps may provide a precise reference point for each data point within a time series or dataset. The temporal tags may further specify time intervals or durations associated with events or activities. For example, tags indicating the start and end times of an event, the duration of a process, or the frequency of data collection intervals. Temporal tags may also include additional attributes or metadata describing the temporal characteristics of the data. This could include tags indicating the time zone, time resolution, periodicity, or temporal context of the data. Temporal tags may also indicate the relevance or importance of data within a specific time frame. For example, tags indicating whether a data point is current, historical, or future-oriented, or tags indicating the urgency or priority of data based on its temporal context.

For example, network conditions may in some instances comprise temporal attributes describing the computer network. These temporal attributes may data and metadata related to signal processing systems within and/or accessible to the computer network. Using these temporal attributes, the system may enable efficient prioritization, processing, storage, and/or retrieval of data based on temporal relevance and importance. This approach enhances the system's ability to handle dynamic workload patterns and ensure timely response to critical signals in various applications. For example, data may include additional time-related features or timestamps indicating when each signal was generated or observed. These features provide temporal context and enable prioritization based on signal freshness or relevance. The primary data being processed may include various types of signals, such as sensor readings, audio recordings, or image frames. Time stamps or metadata associated with each signal provide context for interpretation and processing. Metadata associated with each signal or data stream may include temporal attributes such as creation time, arrival time, or observed time. This metadata helps track the temporal evolution of signals and informs prioritization and processing decisions. Signals may be tagged with priority levels or urgency indicators based on their temporal relevance. This metadata guides resource allocation and processing strategies, ensuring that critical signals receive timely attention.

Using this information, signal processing algorithms may incorporate time-related features or metadata to filter and prioritize incoming data streams. For example, real-time processing systems may focus on recent data while historical analysis tasks may consider a broader time window. Time-related metadata may inform resource allocation decisions, enabling the system to allocate processing resources based on the temporal relevance and importance of incoming signals. Priority signals receive higher processing priority and may be processed with greater computational resources. Furthermore, data storage systems may use time-related metadata for efficient indexing and retrieval of signals based on temporal criteria. Time stamps or temporal attributes enable fast retrieval of historical data or real-time streaming data. Data storage and retrieval systems may implement prioritization policies based on time-related metadata, ensuring that high-priority signals are readily accessible and processed with minimal delay.

In some embodiments, the equation for embedding temporal tags for information retrieval, meta-forecasting and priority signal processing is: $E=f(T,D,M)$ where:

E represents the embedded temporal tag.

T is the temporal feature vector representing the temporal characteristics of the data.

D is the data feature vector representing the content or context of the data.

M is the metadata feature vector representing additional information about the data.

The system may receive along with time stamped data a real-time stream comprises the supplemental signal data. Using this information, the system may determine how to adjust, intercept, and/or use time stamped data and/or the time stamps therein. For these determinations, the system may use a control scheme that comprises rules and routine for using supplemental signal data. For example, the passive priority signal may be dependent on the stability and/or accuracy of traffic demand and thus may not be select by the system (or weighted as heavily) for time stamp adjustment in scenarios with real-time changing traffic demand. The active priority signal may be dependent on the number, frequency, and/or placement of buses within the computer network and thus may not be select by the system (or weighted as heavily) for time stamp adjustment in scenarios with unknown network architectures. For example, the system may record supplemental signal data as shown in table 250.

As shown in table 250, the system has received a plurality of values corresponding to supplemental signal data of various types (e.g., ph1 to ph8). As one illustrative example, table 250 may represent supplemental signal data used in a computer network implementing an application for automated transfers and data transmissions of exchanges through satellite communications. For example, in one embodiment, the system (e.g., via computer network 200) may institute a system and method of a vector network for t–0 clearing, settlement, and Automatic Information Exchange (AEI) through Atomic Network Time Protocol allowing time-division multiplexing access of signal transmissions for dynamic algorithmic intelligence and information. For example, in financial markets there is a time (T–0) currency problem across exchanges when settling securities creating a "currency credit loss". The application facilitated by computer network 200 may mitigate for this latency by allowing for a new form of arbitrage or front-running of automated transfers and data transmissions of exchanges through satellite communications. Due to time zone differences, the shift from T+2 to T+1 for securities delivery may already require that the currencies needed for the corresponding cash delivery are traded and settled T+0. The difficulty of foreign exchange volume forecasting is explained by the unique characteristics of the market, which are over-the-counter, geographically dispersed, continuously operated 24 hours a day (except weekends), and by the variety of factors that affect exchange rates. All this creates distinct and currency-specific volume profiles which are frequently distorted by unexpected events or announcements. As a result, volume predictions need to be not only accurate, but also robust. This can be achieved through various modeling methods. Deploying ensemble methods of forecasting uses multiple algorithms to achieve better predictive performance than could be obtained from any of the constituent forecasting algorithms alone. For example, the system (e.g., via computer network 200) may generate a plurality of forecasts using the same historical and future data, but in which each forecast is built on different methodologies. The final forecast (e.g., as determined by model 206) may be taken to be the average of the four model predictions, which is aimed at improving accuracy over the individual forecasts.

As an example, the system (e.g., using model 206) may forecast the volume of spot trades (in US dollars) over a 120-hour period, from 22:00 GMT on a Sunday to 21:00 GMT on the following Friday. This forecast may be useful for market risk managers and liquidity managers as it may identify upcoming periods of possible price volatility and hours of market illiquidity. In addition, the forecast may help central bankers responsible for monetary policies to detect abnormal market conditions historically. As an example, the system may consider eight major currency pairs (AUD/USD, EUR/GBP, EUR/JPY, EUR/USD, GBP/USD, USD/CAD, USD/CHF, USD/JPY). For each currency pair, the system measures the total value of spot trades that arrives at CLS within consecutive time intervals (e.g., one-hour intervals). The system may assume that the measured series of traded spot volumes realizes some unknown discrete-time stochastic process. The accuracy of predictions depends on the choice of explanatory variables. For spot volume forecasting, the input variables include auto-regressive terms, seasonality factors (hourly, weekly and monthly), scheduled economic events (e.g., GDP, interest rates, bond rates and CPI announcements) and regional holidays.

The system may use various forecasts, including spot volume forecasting (above), futures contracts, digital dark pools, or a new form of SIPC Insurance to include futures contracts and currency. In such an embodiment, the system may mitigate time synchronization latency in computer networks. For example, moving from modem transmission to broadband/fiber transmission to satellite for internet transmission speeds all vary; thus, in such systems each computer network may have some variance in delay/latency. The system may account for this via supplemental signal data that describes the computer networks. For example, the system may allow for atomic time through satellite transmissions to create T–0. Atomic time may allow for the enumeration time and vector embedding of time series creating a vector index and database which may include CDR and metadata of time cycles for a Network Time Protocol (NTP). This may be a new NTP for T–0 to parallel postulate across exchanges and allow for time-division multiplexing of signals.

Digital signal processing of atomic time/settlement/transmission may then be divided by the system into signal priority strategies or stream processing into three categories (e.g., passive priority signal, active priority signal, and adaptive signal). The passive priority signal may analyze historical traffic data. The signal highly depends on the stability and accuracy of traffic demand and is not efficient for real-time changing traffic scenarios. The active priority signal may analyze real-time signal timing to ensure buses get through intersections directly when buses are detected approaching intersections. The adaptive signal may be based on real-time detected traffic flow data for signal timing optimization control.

The system may receive a data stream that includes various types of information such as attributes (e.g., each attribute of the data stream represents a certain type of data, e.g. segment/data point ID, timestamp, geodata), timestamp attribute, which helps to identify when an event occurred, subject ID, which is an encoded-by-algorithm ID, that has been extracted out of a cookie, raw data that includes information straight from the data provider without being processed by an algorithm nor human, and/or processed data, which is a data that has been prepared (somehow modified, validated or cleaned), to be used for future actions. For example, the system (e.g., model 206) may use one or more attributes to process the data stream using the control scheme. As one example, the system may determine the time source for an initial time stamp and adjust how the time stamp is annotated and/or used based on the time source. For example, as data is transmitted and/or received via computer network 200, the system may measure various attributes about computer network 200 and its components to generate the supplemental signal data.

The system can generate multiple signals or data streams into a dynamic channel for simultaneous transmission and store all generated data in the vector network for market equilibrium. To ensure agents can predict future signals and provide a reasonable basis to select actions, the system considers signal information in state space. The system also considers a priority signal-switching scheme in the state space to solve the problem of response conflict. The system may then use a multi-objective reward function is adopted to make agents more sensitive to the change of reward value and optimize the indicators of average delay and signal throughput simultaneously.

For example, table 250 may represent supplemental signal data in a vector state. For example, table 250 may represent time series data received from one or more time sources. Furthermore, table 250 may represent time series data as annotated based on a supplemental signal data. For example, the time series data may comprise an attribute or value that be used to determine whether to execute a trade (e.g., a recommendation to move from one state to another such as to execute a trade). The system may weigh the time series data based on the supplemental signal data to generate a plurality of potential recommendations and/or values used to make recommendation (e.g., ph1 to ph8), wherein each of the recommendations and/or values corresponds to time series data as weighted by a different type of supplemental signal data. The recommendations may then be used as an input to a model (e.g., model 206) to determine a final recommendation.

Figure 4A:
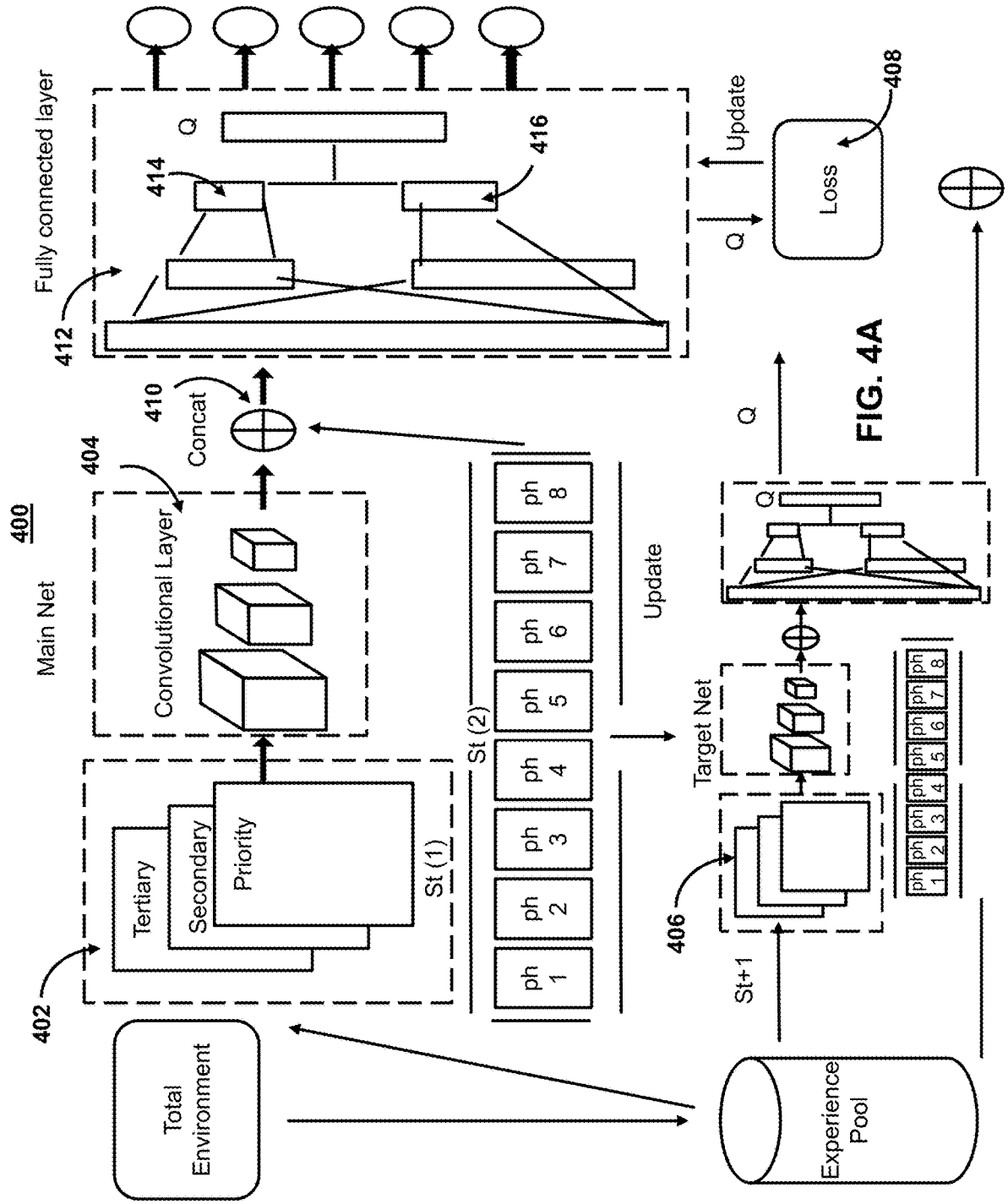
FIG. 4A shows an illustrative computer architecture for using supplemental signal data to mitigate time synchronization latency in computer networks, in accordance with one or more embodiments.

The system may be based on Proximal Policy Optimization (PPO) and/or 3DQN (Double Dueling Deep Q-Network) to control intersection signals (e.g., as shown in FIG. 4A). For example, 3DQN is a sophisticated reinforcement learning algorithm that integrates several advancements to address the complexities of decision-making tasks. It synergistically combines elements from Double Q-Learning, Dueling Network Architectures, and Deep Q-Networks (DQN). DQN itself is a pivotal development that utilizes deep neural networks to approximate the Q-value function, which assesses the quality of actions within various states of an environment. This model allows for handling environments with extensive state spaces by replacing traditional Q-learning's tabular approach with a neural network. To mitigate the overestimation bias commonly observed in traditional Q-learning, where values are often predicted to be higher than they actually are, Double Q-Learning employs two separate Q-value estimators. One estimator selects the best action, and the other independently evaluates this action's value, thereby reducing overestimations by decoupling action selection from its evaluation. Additionally, Dueling Network Architectures enhance the model by dividing the neural network into two distinct pathways: one that computes the value of being in a given state, and another that calculates the advantage of taking specific actions over others. This dual approach allows for a finer distinction between the state's value and the effectiveness of each action, leading to more nuanced policy learning. Together, these components make the Double Dueling Deep Q-Network a powerful tool for efficiently learning optimal policies in environments that pose high-dimensional challenges. It has shown significant improvements in learning speed and policy stability, making it effective in applications ranging from video gaming to robotic control. This integration of double estimation, advanced neural network architecture, and deep learning facilitates a robust framework for tackling complex reinforcement learning scenarios.

The model (e.g., model 206) may take the position and speed of agents as the state and takes the cumulative waiting time difference between two adjacent cycles as the reward. For example, the initial state (St1) may correspond to the state of actor perception behavior. The state of actor priority phase switching may correspond to St2. As shown in table 250, the actors' signal information is represented by a three-dimensional vector (x, y, z), where x represents left buy, y represents sell, and z represents repo. For example, table 250 may represent a prioritized action based on the annotated time series data and a value of the prioritized action.

The system may use time series data to obtain the real-time position of the actor's notification and location dynamic time-division multiplexing and express it in Ps. The method can ensure the actor with the largest Pr has a priority on the transaction such that:

$$Pr=Ps+De$$

Where, Pr represents the priority level of the actor, Ps represents the position of the actor, De represents the delay of the actor. As shown, the system may use a control scheme to generate annotated time series data based on the time series data, wherein each time series datum of the annotated time series data comprises a weight assigned by the control scheme. This weight may be represented by the values in table 250. Through the use of the weights (or priorities), the system may determine what recommendations (and/or for what actor) to make.

In some embodiments, the system may associate temporal tags with edges in the network, representing the connections or interactions between nodes. Each edge may be tagged with temporal metadata indicating when the interaction occurred or was observed. For example, if the vector network represents social interactions between individuals, each edge connecting two nodes (individuals) may be tagged with a timestamp indicating the time at which the interaction took place. The system may use temporal tags to weight the edges in the network based on their temporal relevance or significance. Temporal relevance scores associated with edges may reflect the importance or strength of interactions between nodes at different points in time. For example, edges representing recent interactions between nodes may be assigned higher weights or temporal relevance scores than edges representing older interactions. The system may analyze the temporal dynamics of the network by leveraging temporal tags to study how interactions between nodes evolve over time. Temporal network analysis techniques may include identifying temporal patterns, detecting trends, and predicting future interactions based on historical data. For example, the system may use temporal tags to analyze the spread of information or influence within a social network over time, identifying key nodes or communities that play significant roles at different points in time.

Additionally or alternatively, table 250 may represent the use of temporal tags to weight and/or influence the selection of one or more potential recommendations. For example, an example of a temporal tag for priority signal processing in the context of currency trading could be a "FX impact" tag associated with each currency exchange rate update. This tag indicates the impact of recent news events or economic announcements on the currency exchange rate, helping prioritize signals for processing based on their potential market-moving significance. Signals indicating currency exchange rate updates following major economic announcements, such as central bank interest rate decisions, GDP releases, or employment reports. These updates are likely to have a significant improvement on currency markets and require immediate attention for trading decisions (and thus be weighed highly, prioritized, etc.). Signals indicating currency exchange rate updates in response to moderate news events or economic data releases, such as inflation figures, retail sales reports, or trade balance updates. While these updates may affect market sentiment, they are not as influential as major announcements and may be processed with slightly lower priority. Signals indicating currency exchange rate updates with minimal market impact, such as routine market fluctuations or technical price movements. These updates may be of interest for informational purposes but do not warrant immediate action for trading decisions. The FX impact tag provides contextual information about the significance of each currency exchange rate update, enabling traders and automated trading systems to prioritize signals for processing based on their potential market impact. Signals with higher news impact receive priority processing to facilitate timely decision-making and execution of trading strategies, while lower impact signals are processed with less urgency. This approach helps traders focus on market-moving events and react promptly to changes in currency exchange rates.

In another example, a temporal tag for priority signal processing may be used in digital/stock exchanges via a "volatility event" tag associated with each stock price update. This tag may indicate the occurrence of significant market volatility or price movements, helping prioritize signals for processing based on their potential impact on trading decisions. The volatility event tag provides contextual information about the magnitude and significance of each stock price update, enabling traders and trading algorithms to prioritize signals for processing based on their potential impact on trading strategies and risk management. Signals associated with higher volatility events receive priority processing to facilitate timely decision-making and execution of trading orders, while lower volatility events are processed with less urgency. This approach helps traders stay informed about market dynamics and react promptly to changes in stock prices. Signals indicating rapid and substantial price changes in a stock, triggered by events such as earnings announcements, mergers and acquisitions, or geopolitical developments. These events often signal heightened market activity and require immediate attention for risk management and trading decisions (and thus be weighed highly, prioritized, etc.). Signals indicating moderate price fluctuations or volatility in a stock, driven by factors such as sector-specific news, macroeconomic indicators, or technical analysis patterns. While these events may impact trading strategies, they are not as significant as high volatility events and may be processed with slightly lower priority. Signals indicating minimal price movements or volatility in a stock, occurring during periods of market stability or low trading activity. These events are of less immediate concern for traders and may be processed with lower priority for monitoring or informational purposes.

FIGS. 3A-B shows an illustrative example of pseudocode used for determining supplemental signal data, in accordance with one or more embodiments. For example, FIG. 3A represents a first algorithm for determining supplemental signal data. As shown in FIG. 3A, algorithm 300 describes a process for determining an atomic time signal transmission using the Network Time Protocol (NTP) library. In this example, the transaction class represents a financial transaction with a unique ID, an amount, and a timestamp obtained from an NTP server. The AtomicTimeMultiplexer class manages the transmission of financial transactions with atomic timestamps. The add_transaction method is used to add financial transactions to the multiplexer. The run_atomic_time_transmission method simulates the transmission of transactions with atomic timestamps.

For example, FIG. 3B represents a second algorithm for determining supplemental signal data. As shown in FIG. 3B, algorithm 350 describes a process using time-division multiprocess multiplexing signal transmission—TDMPS-3DQN (Parallel Double Dueling Deep Q Network) algorithm. For example, algorithm 350 may be used to account for time dilation by using two networks with different parameters to evaluate and select an action. Algorithm 350 employs the multi-process parallel method to improve the sampling efficiency of the vector network. Algorithm 350 adopts Dueling DQN to enhance the learning effect. For example, implementing a Time-Division Multiplexing (TDM) algorithm for financial transactions involves dividing the available time into time slots and allocating each transaction a specific time slot for transmission (as shown in table 250). The "Transaction" class represents a financial transaction with a unique ID and an amount. The "TDMMultiplexer" class is responsible for managing the time-division multiplexing of financial transactions. The "add_transaction" method is used to add financial transactions to the multiplexer. The "run_tdm" method simulates the time-division multiplexing process by iterating through time slots and transmitting transactions within their allocated time slots.

For example, FIG. 3C represents a second algorithm for determining supplemental signal data. As shown in FIG. 3C, algorithm 370 describes a process using temporal tags. For example, algorithm 370 may represent Python code for implementing dynamic embedded temporal data and temporal tags using Pandas for data manipulation and real-time data processing.

FIG. 4A shows an illustrative computer architecture for using supplemental signal data to mitigate time synchronization latency in computer networks, in accordance with one or more embodiments. As shown in model 400, there are four components: vector network 402, main network 404, target network 406, and loss function 408. Model 400 may comprise a 3DQN.

For example, main network 404, typically a neural network itself, processes raw or preprocessed data, which may include annotated time series data in this scenario. The annotations in the time series data likely provide additional information such as labels or important features that aid main network 404 in extracting and prioritizing relevant features from the data. This preparation is crucial as it tailors the inputs specifically for target network 406. Main network 404 may receive annotated time series data from vector network 402 (which may classify signals into priority, secondary, and tertiary categories based on time-related features, such as urgency, freshness, or time sensitivity). Once main network 404 processes the data, it passes the refined inputs to target network 406. Notably, main network 404 (as well as target network 406 and/or model 412 may generate a plurality of recommendations (e.g., ph1 to ph8) as described above (e.g., in relation to table 250 (FIG. 2)).

Target network 406, designed for more specific or advanced processing, takes these inputs and performs its computations, outputting results that are directly tied to the objectives of model 400, such as classifications, regressions, or other forms of data interpretations. These outputs from target network 406 are then directed to two pathways: loss function 408 and concatenation layer 410. The loss function evaluates the predictions of target network 406 by comparing them against true values or labels, calculating a measure of error or 'loss.' This loss provides a feedback signal used to adjust and improve the model through training, guiding the network towards minimizing error and improving accuracy in subsequent iterations. Simultaneously, the outputs are also sent to concatenation layer 410. This layer is instrumental in merging these outputs with additional data streams or features, perhaps from parallel processed layers or earlier stages of the network. This concatenated output ensures that the final input to the subsequent convolutional neural network contains a rich, feature-enhanced dataset.

The enriched data from the concatenation layer is input into model 412, which is a convolutional neural network (CNN). The CNN, with its strong capabilities in feature detection and spatial hierarchy processing, further analyzes the data to make the final predictions or assessments. This step is particularly effective in tasks involving images or spatial data but is also highly useful in enhancing the feature interaction understanding for various other types of data inputs. This architecture, combining different specialized networks and functional layers, leverages the strengths of each component to achieve highly accurate outputs, suitable for complex decision-making tasks in applications.

To mitigate the overestimation bias commonly observed in traditional Q-learning, where values are often predicted to be higher than they actually are, model 400 may use Double Q-Learning by employing two separate Q-value estimators (e.g., main network 404 and target network 406). One estimator selects the best action, and the other independently evaluates this action's value, thereby reducing overestimations by decoupling action selection from its evaluation. Additionally, model 400 divides the neural network into two distinct pathways: one that computes the value of being in a given state (e.g., ph1 to ph8), and another that calculates the advantage of taking specific actions over others (e.g., ph1 to ph8). This dual approach allows for a finer distinction between the state's value and the effectiveness of each action, leading to more nuanced policy learning. Together, these components make model 400 a powerful tool for efficiently learning optimal policies in environments that pose high-dimensional challenges. The two pathways may then be merged into model 412 to generate a final recommendation.

In some embodiments, model 400 may comprise a plurality of artificial intelligence models. In some embodiments, model 400 may correspond to model 206 (FIG. 2). Model 400 may have various architecture and/or use various algorithms. In some embodiments, model 400 may comprise an auto-regressive model. Auto-regressive models, a type of least-squares regressions, specify that the output variable depends linearly on its own previous values, some exogenous explanatory variables, and on a stochastic term. Least-squares regression fits a model by minimizing the sum of the squared differences between past actual values of the output variable and the model's own predictions of those values given the input variables at the time. Regularized least-squares auto-regressive models aim to overcome a well-known generalization problem that past actions may not reflect future behavior, and penalize for overfitting to historical data. Standard and regularized linear regressions are global models, where there is a single predictive formula holding over the entire data space. Regression model trees are an alternative modeling approach in which the entire data space is subdivided (partitioned) into smaller regions using a decision-tree induction algorithm. In the second stage, a simple regression model is then built for each cell of the partition. A combination of the predictions from different models along the same path through the tree is then used in prediction.

In some embodiments, model 400 may be a support vector machine (SVM). SVMs are a machine-learning technique grounded in statistical learning theory, which characterizes the properties of learning machines that enable them to generalize well to unseen data. They were first developed for classification problems but later generalized to regression-type problems. The fundamental model underlying an SVM is a separating hyperplane in a high or infinite-dimensional feature space mapped from the input data space by a nonlinear kernel function. While SVMs can be complex black-box functions, similar to neural networks, they have the ability to model highly nonlinear processes.

In some embodiments, model 400 may be a neural network. Model 400 includes vector network 402. Vector network 402 may comprise data related to time series. Model 400 also includes one or more hidden layers. Model 400 may be based on a large collection of neural units (or artificial neurons). Model 400 loosely mimics the manner in which a biological brain works (e.g., via large clusters of biological neurons connected by axons). Each neural unit of a model 400 may be connected with many other neural units of model 400. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function such that the signal must surpass before it propagates to other neural units. Model 400 may be self-learning and trained, rather than explicitly programmed, and can perform significantly better in certain areas of problem solving, as compared to traditional computer programs. During training, concatenation layer 410 may correspond to a classification of model 400 (e.g., contacts awaiting assignment to an agent, etc.) and an input known to correspond to that classification may be input into vector network 402. In some embodiments, model 400 may include multiple layers (e.g., where a signal path traverses from front layers to back layers). In some embodiments, back propagation techniques may be utilized by model 400 where forward stimulation is used to reset weights on the "front" neural units. In some embodiments, stimulation and inhibition for model 400 may be more free-flowing, with connections interacting in a more chaotic and complex fashion. Model 400 also includes concatenation layer 410. During testing, output layer 458 may indicate whether or not a given input corresponds to a classification of model 400 (e.g., a known annotation, a known weight, a known time-shift, etc.).

Concatenation layer 410 may comprise a concatenation layer, commonly referred to as a concat layer, is used to combine the outputs of multiple layers into a single layer. This operation merges the outputs along a specified axis without changing the size of the data along other dimensions, effectively concatenating the tensor outputs from preceding layers. The primary purpose of a concat layer is to enrich the feature set available to the network by bringing together diverse features processed in different parts of the network. This is particularly useful in models where it's beneficial to maintain and merge different kinds of information processed through separate pathways. For example, in convolutional neural networks used for image processing, a concat layer can be used to combine feature maps from different convolutional layers, allowing the model to use both low-level features (like edges and textures) and high-level features (like shapes and objects) simultaneously. Concat layers are crucial in architectures like U-Nets, used for tasks such as image segmentation, where high-resolution features from early layers are concatenated with upsampled features from deeper layers to provide precise localization and context information in the output. This technique is also popular in models that process multimodal data, where different kinds of data inputs (e.g., visual and textual) need to be merged into a unified representation for further processing.

Model 400 also includes model 412, which is a convolutional neural network. The convolutional neural network is an artificial neural network that features one or more convolutional layers. Convolutional layers extract features from an input. Convolution preserves the relationship between the inputted data by learning features using partitions of the input data. As shown in model 412, inputs may proceed to convolution blocks 414 and 416 before being output. In some embodiments, model 412 may itself serve as an input to model 400.

In some embodiments, model 412 may implement an inverted residual structure where the input and output of a residual block (e.g., block 414) are thin bottleneck layers. A residual layer may feed into the next layer and directly into layers that are one or more layers downstream. A bottleneck layer (e.g., block 416) is a layer that contains few neural units compared to the previous layers. Model 412 may use a bottleneck layer to obtain a representation of the input with reduced dimensionality. An example of this is the use of autoencoders with bottleneck layers for nonlinear dimensionality reduction. Additionally, model 412 may remove non-linearities in a narrow layer (e.g., block 416) in order to maintain representational power. In some embodiments, the design of model 412 may also be guided by the metric of computation complexity (e.g., the number of floating point operations). In some embodiments, model 412 may increase the feature map dimension at all units to involve as many locations as possible instead of sharply increasing the feature map dimensions at neural units that perform downsampling. In some embodiments, model 412 may decrease the depth and increase width of residual layers in the downstream direction.

Model 400 may take inputs and provide outputs. The inputs may include multiple datasets such as a training dataset and a test dataset. Each of the plurality of datasets may include time series data, annotated time series data, temporal tags, weights, time-shifts, etc. In some embodiments, outputs may be fed back to model 400 as inputs to train model 400. For example, the system may receive a first labeled feature input, wherein the first labeled feature input is labeled with a known description (e.g., a known annotation, a known weight, a known time-shift, etc.).for the first labeled feature input (e.g., a feature input based on labeled training data). The system may then train the first artificial intelligence model to classify the first labeled feature input with the known description.

In another embodiment, model 400 may update its configurations (e.g., weights, biases, or other parameters) based on the assessment of its prediction (e.g., as transmitted to target network 406) and reference feedback information (e.g., user indication of accuracy, reference labels, or other information). In another embodiment, where model 400 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, model 400 may be trained to generate better predictions.

In some embodiments, model 400 may include an artificial neural network. In such embodiments, model 400 may include an input layer and one or more hidden layers. Each neural unit of model 400 may be connected with many other neural units of model 400. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 400 may be self-learning and trained, rather than explicitly programmed, and can perform significantly better in certain areas of problem solving, as compared to traditional computer programs. During training, an output layer of model 400 may correspond to a classification of model 400, and an input known to correspond to that classification may be input into an input layer of model 400 during training. During testing, an input without a known classification may be input into the input layer, and a determined classification may be output.

In some embodiments, model 400 may include multiple layers (e.g., where a signal path traverses from front layers to back layers). In some embodiments, back propagation techniques may be utilized by model 400 where forward stimulation is used to reset weights on the "front" neural units. In some embodiments, stimulation and inhibition for model 400 may be more free-flowing, with connections interacting in a more chaotic and complex fashion. During testing, an output layer of model 400 may indicate whether or not a given input corresponds to a classification of model 400 (e.g., an incident).

For example, in some embodiments, the system may train an artificial intelligence model (e.g., an artificial neural network) to detect known descriptions based on a feature input. For example, the system may receive user data (e.g., comprising the variables and categories of variables described herein). The system may then generate a series of feature inputs based on the training data. For example, the system may generate a first feature input based on training data comprising user data corresponding to a first known error (or error likelihood). The system may label the first feature input with the first known description (e.g., labeling the data as corresponding to a classification of the description).

For example, in some embodiments, the system may train an artificial intelligence model (e.g., an artificial neural network) to determine a known annotation, a known weight, a known time-shift, etc. For example, the system may receive a criterion (e.g., a known annotation, a known weight, a known temporal tag, a known time-shift, etc.). The system may then generate a series of feature inputs based on the criterion. For example, the system may generate a feature input based on training data comprising content corresponding to the model's interpretation, and the system may determine a response (e.g., a known annotation, a known temporal tag, a known weight, a known time-shift, etc.).

The system may then train an artificial intelligence model to detect the first known content based on the labeled first feature input. The system may also train an artificial intelligence model (e.g., the same or different artificial intelligence model) to detect a second known content based on a labeled second feature input. For example, the training process may involve initializing some random values for each of the training matrices (e.g., of an artificial intelligence model) and attempting to predict the output of the input feature using the initial random values. Initially, the error of the model may be large, but by comparing the model's prediction with the correct output (e.g., the known classification), the model is able to adjust the weights and biases values until the model provides the required predictions.

In some embodiments, the system may use one or more modeling approaches, including supervised modeling. Such supervised machine learning approaches such as linear or nonlinear regression, including neural networks and support vector machines, could be exploited to predict these processing requirements, should sufficient amounts of training data be available. In particular, processing requirement data can be sequential, time-dependent data, and this means that Recurrent Neural Networks (RNNs), CNN, and/or transformers, specifically, may be highly applicable in this setting for accurate price forecasting. In some embodiments, the system may use a model involving time series prediction and use Random Forest algorithms, Bayesian RNNs, LSTMs, transformer based models, CNNs or other methods, or combinations of two or more of these and the following: Neural Ordinary Differential Equations (NODEs), stiff and non-stiff universal ordinary differential equations (universal ODEs), universal stochastic differential equations (universal SDEs), and/or universal delay differential equations (universal DDEs).

In some embodiments, the system may use a model that comprises generative artificial intelligence. Generative artificial intelligence is a type of artificial intelligence technology that can produce various types of content, including text, imagery, audio and synthetic data. Additionally or alternatively, the system may use LLM of small language models (SLM). For example, a LLM is a type of artificial intelligence algorithm that uses deep learning techniques and massively large data sets to understand, summarize, generate and/or predict new content. The system may also use a SLM where training the smaller models consumes less energy and costs less by shifting the knowledge memorized by the model from the parameters into an external database, which not only reduces the number of necessary parameters, but also makes the model's knowledge easier to update. For example, instead of retraining the model, the system may simply extend the document database by feeding new data to the models and storing the resulting document embeddings.

The system may receive user data via a microservice and/or other means. For example, the microservice may comprise a collection of applications that each collect one or more of a plurality of variables. For example, the system may extract user data from an API layer operating on a user device or at a service provider (e.g., via a cloud service accessed by a user). Additionally or alternatively, the system may receive user data files (e.g., as a download and/or streaming in real time or near real time).

FIG. 4B shows an artificial intelligence model architectures for using in one or more applications, in accordance with one or more embodiments. For example, the system may include one or more artificial intelligence models, architectures, and/or data preparation steps to mitigate latency. The system may determine which artificial intelligence model to use for one or more determinations (e.g., a known annotation, a known weight, a known time-shift, etc.). The system may select the artificial intelligence model (e.g., from the plurality of artificial intelligence models) that is best suited for providing the most accurate result. For example, the system may select from various ensemble architectures featuring one or more models that are trained (e.g., in parallel) to provide the most accurate result.

Model 450 illustrates an artificial neural network. Model 450 includes input level 452. Input level 452 may receive data related to a known metadata tag requirement, metadata field, content population function, etc. Model 450 also includes one or more hidden layers (e.g., hidden layer 454 and hidden layer 456). Model 450 may be based on a large collection of neural units (or artificial neurons). Model 450 loosely mimics the manner in which a biological brain works (e.g., via large clusters of biological neurons connected by axons). Each neural unit of a model 450 may be connected with many other neural units of model 450. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function such that the signal must surpass before it propagates to other neural units. Model 450 may be self-learning and trained, rather than explicitly programmed, and can perform significantly better in certain areas of problem solving, as compared to traditional computer programs. During training, output layer 458 may correspond to a classification of model 450 (e.g., contacts awaiting assignment to an agent, etc.) and an input known to correspond to that classification may be input into input level 452. In some embodiments, model 450 may include multiple layers (e.g., where a signal path traverses from front layers to back layers). In some embodiments, back propagation techniques may be utilized by model 450 where forward stimulation is used to reset weights on the "front" neural units. In some embodiments, stimulation and inhibition for model 450 may be more free-flowing, with connections interacting in a more chaotic and complex fashion. Model 450 also includes output layer 458. During testing, output layer 458 may indicate whether or not a given input corresponds to a classification of model 450 (e.g., a known metadata tag requirement, metadata field, content population function, etc.).

FIG. 4B also includes model 470, which is a convolutional neural network. The convolutional neural network is an artificial neural network that features one or more convolutional layers. Convolutional layers extract features from an input. Convolution preserves the relationship between the inputted data by learning features using partitions of the input data. As shown in model 470, input layer 472 may proceed to convolution blocks 474 and 476 before being output to convolutional output 480. In some embodiments, model 470 may itself serve as an input to model 450.

In some embodiments, model 470 may implement an inverted residual structure where the input and output of a residual block (e.g., block 474) are thin bottleneck layers. A residual layer may feed into the next layer and directly into layers that are one or more layers downstream. A bottleneck layer (e.g., block 478) is a layer that contains few neural units compared to the previous layers. Model 470 may use a bottleneck layer to obtain a representation of the input with reduced dimensionality. An example of this is the use of autoencoders with bottleneck layers for nonlinear dimensionality reduction. Additionally, model 470 may remove non-linearities in a narrow layer (e.g., block 478) in order to maintain representational power. In some embodiments, the design of model 470 may also be guided by the metric of computation complexity (e.g., the number of floating point operations). In some embodiments, model 470 may increase the feature map dimension at all units to involve as many locations as possible instead of sharply increasing the feature map dimensions at neural units that perform downsampling. In some embodiments, model 470 may decrease the depth and increase width of residual layers in the downstream direction.

In some embodiments, model 450, model 470, and/or other models described herein may be use for improvements to Retrieval-Augmented Generation (RAG) and Retrieval-Augmented Understanding (RAU). RAG is an approach that combines the powers of a large language model with a retriever model to enhance the generation of responses. This involves using a retriever model to fetch relevant documents or data from a large corpus or database based on the input query. The retriever is typically a machine learning model trained to rank documents in order of relevance to the query. The retrieved documents are then fed into a language model, like GPT (Generative Pre-trained Transformer), which uses this additional context to generate a more informed, accurate, or relevant response. The language model integrates the content of the retrieved documents into its pre-existing knowledge to enhance the output. RAG is particularly useful for applications where accuracy of factual information is crucial, such as in question-answering systems, or where specific details are necessary to generate a more complete response. RAU integrates external information retrieval with understanding or comprehension tasks. For example, it represents a hybrid approach where artificial intelligence systems leverage external databases or sources of information to enhance their responses and understanding (e.g., for information retrieval, document understanding, and/or dialogue systems related to a user's query or determining a given context).

In some embodiments, the data received by and sent to a RAG model may be time series data. In such instances, the RAG model, its recommendations, and/or the applications using the model may be improved through the use of supplemental signal data. Temporal tags may be used in integrating temporal context and relevance information into RAG models, enhancing their ability to retrieve and generate text that is contextually relevant to the input query within a specific temporal framework. By leveraging temporal tags, RAG models may produce more accurate and contextually appropriate text responses that reflect the temporal dynamics of the underlying information.

For example, during the retrieval phase, documents or passages are retrieved based on their relevance to the input query. Temporal tags associated with each retrieved document or passage indicate their temporal relevance or recency, helping prioritize them for relevance ranking. For example, documents or passages with recent publication dates or timestamps may be assigned higher temporal relevance scores, indicating their importance in the current temporal context.

In the generation phase, the RAG model generates text based on both the input query and the retrieved documents or passages. Temporal tags associated with the retrieved content may be used to condition the generation process on the temporal context relevant to the input query. For example, temporal tags indicating the time period or historical context of the retrieved content may influence the generation of text by providing contextually relevant information or guiding the choice of language and tone.

Temporal tags associated with both the input query and the retrieved content may be used as part of a feedback mechanism to evaluate the relevance and quality of generated text. Temporal relevance metrics may inform the refinement of the RAG model's retrieval and generation strategies over time. For example, temporal tags indicating the recency or temporal relevance of retrieved content may be used to assess the effectiveness of the RAG model in capturing current events or trends in generated text.

Temporal embedding may enhance RAG by providing additional temporal context and information that improves the model's understanding of the input text and retrieved context. As one example, temporal embedding may improve RAG models by capturing temporal dynamics. Temporal embedding represents temporal information and patterns in a lower-dimensional space, allowing RAG models to capture temporal dynamics and trends in the input text and retrieved context. By incorporating temporal embedding into the model architecture, RAG may consider how information evolves over time and make contextually relevant predictions or responses based on temporal context.

As another example, temporal embedding may improve RAG models by contextualizing information retrieval. Temporal embedding may help contextualize information retrieval by capturing the temporal relevance of retrieved context to the input text. RAG models may use temporal embedding to prioritize recent or temporally relevant information from external knowledge sources, ensuring that the retrieved context is up-to-date and contextually appropriate for the input query or text.

As another example, temporal embedding may improve RAG models by improving temporal reasoning. Temporal embedding enables RAG models to perform temporal reasoning by understanding the sequence of events, actions, or changes described in the input text and retrieved context. By embedding temporal information into the model representation, RAG may infer causal relationships, predict future events, and make contextually informed decisions based on the temporal context provided by the input text and retrieved information.

As another example, temporal embedding may improve RAG models by adapting to time-varying data. Temporal embedding helps RAG models adapt to time-varying data and changing contexts by encoding temporal features and trends into the model representation. RAG may use temporal embedding to track changes in the input text and retrieved context over time, ensuring that the model's responses remain relevant and accurate as the underlying data evolves.

As another example, temporal embedding may improve RAG models by improving the response quality. By incorporating temporal embedding, RAG models may produce more accurate, relevant, and informative responses by considering temporal context and dynamics in the input text and retrieved information. Temporal embedding helps RAG generate responses that are sensitive to the temporal context of the input query or text, leading to more contextually appropriate and useful responses for users.

In some embodiments, the system may represent signals as time-series data, where each data point is associated with a specific timestamp or time interval. The system may preprocess the signal data to extract relevant features and encode them along with time-related information. This could include frequency domain features, amplitude, phase, or other characteristics of the signal. The system may adapt the RAG model architecture to accept input embeddings that include both signal features and time-related information. The system may also be designed to effectively capture temporal dependencies and patterns in the signal data, leveraging mechanisms such as convolutional neural networks (CNNs), recurrent neural networks (RNNs), or temporal convolutional networks (TCNs). The system may train the RAG model on a dataset of labeled signal data, where each example includes both the signal waveform and its associated time-related features. The system may then fine-tune the model parameters to optimize performance for signal processing tasks, such as classification, denoising, or prediction. During inference, the system may provide the RAG model with input embeddings containing signal features and time-related information. The system may use the model's capabilities to process the signal data and generate outputs based on the specified time context. This could involve tasks such as signal classification, anomaly detection, or forecasting.

For example, the system may apply pattern recognition and machine learning techniques to identify and classify temporal patterns or events represented by temporal expressions. This involves training models on labeled data to recognize specific temporal patterns or predict future temporal behavior and add a timestamp. For example, the system may train a classification model to recognize different types of temporal events (e.g., weekdays vs. weekends) based on features extracted from temporal expressions. Additionally or alternatively, the system may continuously update embedded temporal data and temporal tags as new data becomes available in real-time. This involves capturing and processing incoming data streams or events and incorporating them into the temporal representation. For example, in a streaming analytics system, continuously update temporal data and tags as new sensor readings or events are received, reflecting the most recent state of the system. In some embodiments, the system may use temporal tagging for Neural Basis Expansion Analysis (NBEA) for interpretable time series forecasting may provide additional contextual information about the temporal aspects of the data and the basis functions learned by the neural network. Temporal tagging may enhance Neural Basis Expansion Analysis for interpretable time series forecasting by providing a richer and more contextualized understanding of the temporal aspects of the data and the basis functions learned by the neural network. Temporal tagging may facilitate the modeling of temporal dynamics in the basis functions by capturing their temporal relationships and dependencies. By tagging basis functions with temporal labels, users could analyze how different temporal factors interact and evolve over time, leading to a deeper understanding of the underlying temporal dynamics. For example, temporal tagging may enable users to track the evolution of basis functions representing short-term fluctuations or long-term trends in the time series data and assess their impact on the forecasted results over time. Temporal tagging may aid in the interpretation and analysis of the basis functions by providing additional context and insights into their temporal relevance and significance. Users may leverage temporal tags to identify important temporal patterns, trends, or anomalies in the basis functions and their contributions to the forecasted results. For example, temporal tagging may help users identify basis functions corresponding to specific seasonal effects, trends, or recurring events in the time series data, leading to more interpretable and actionable insights.

Figure 5:
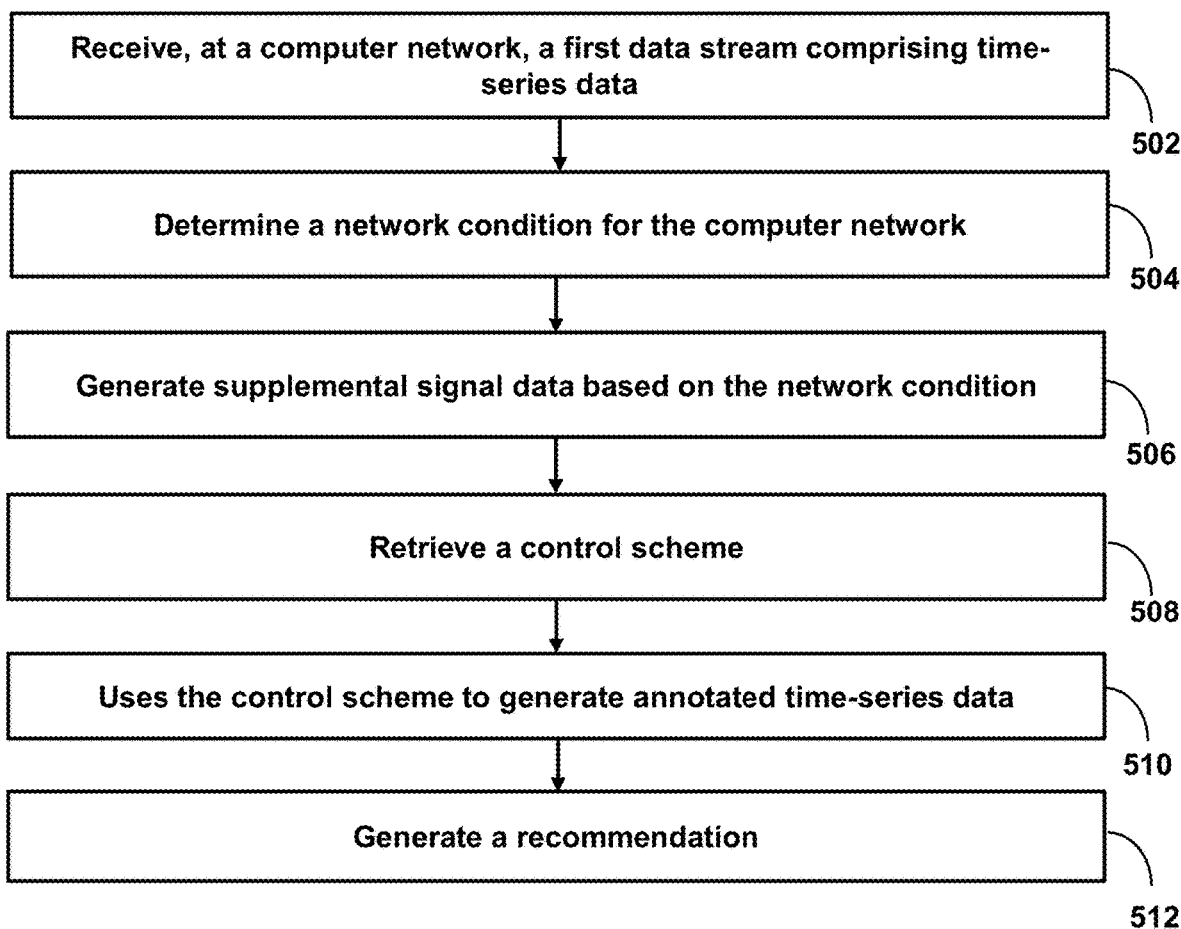
FIG. 5 shows a flowchart for steps involved in mitigating time synchronization latency in computer networks, in accordance with one or more embodiments.

FIG. 5 shows a flowchart for steps involved in mitigating time synchronization latency in computer networks, in accordance with one or more embodiments. For example, the system may use process 500 (e.g., as implemented on one or more system components described above) in order to determine recommendations for one or more applications.

At step 502, process 500 (e.g., using one or more components described above) receives, at a computer network, a first data stream comprising time-series data. For example, the system may receive, at a first computer network, a first data stream comprising time series data, wherein the time series data includes time stamps generated using a first time source. In a system where a first computer network receives a stream of time-series data, each data point may be initially stamped with a timestamp from a primary time source, ensuring accurate recording of the exact time of data collection. The sources may comprise devices such as sensors or user interfaces that generate data continuously or at predefined intervals. After data collection, the time-stamped data is packaged into a structured data stream, typically using protocols designed for real-time data transfer like MQTT (Message Queuing Telemetry Transport) or Web-Sockets, which are chosen based on specific system requirements. The next step involves securely transmitting this data stream over the network. This phase includes passing the data through various network devices and potentially across different network segments or the internet, with robust security measures such as encryption and secure transfer protocols (e.g., TLS/SSL) to safeguard the data from unauthorized access or tampering. Upon arrival at the first computer network, the data stream is received by a server or gateway equipped to handle such data.

At step 504, process 500 (e.g., using one or more components described above) determines a network condition for the computer network. For example, the system may determine a first network condition for the first computer network. The system may use network monitoring tools to gather key metrics such as bandwidth usage, data throughput, packet loss, latency, error rates, and signs of congestion. These metrics may be gathered using protocols like SNMP (Simple Network Management Protocol), which is installed on network devices such as routers, switches, and servers. Additionally, real-time traffic data captured by network analyzers provides insights into data flow and helps identify bottlenecks. The network's performance may be further evaluated by analyzing these collected metrics to spot trends, such as peak usage periods and potential hardware inefficiencies.

In some embodiments, generating the first supplemental signal data for the first computer network based on the first network condition may comprise the system determining historical traffic data for the first computer network and determining the first network condition based on the historical traffic data. The historical traffic data may encompass various metrics such as bandwidth usage, latency, packet loss, throughput, and/or error rates, which provide a detailed historical perspective on network performance. The system then analyzes this historical data to identify patterns, trends, and anomalies, using statistical techniques and machine learning algorithms to understand typical network behavior and the impact of external factors. Based on the insights gleaned from this analysis, the system determines the current network condition by predicting potential issues or recognizing ongoing patterns-such as peak loads at specific times. With this understanding, it then generates supplemental signal data tailored to address the identified network conditions. For instance, the system may suggest reallocating bandwidth or adjusting routing protocols to optimize performance during expected peak times. The system employs adaptive and predictive mechanisms to continuously refine these recommendations, ensuring they remain accurate as real-time network conditions evolve. It compares ongoing network performance with historical predictions, adjusting the supplemental data as necessary. This process is supported by a feedback loop where the effectiveness of the supplemental data is monitored, and outcomes are used to enhance future predictions and adjustments.

In some embodiments, generating the first supplemental signal data for the first computer network based on the first network condition comprises the system detecting real-time bus communications for the first computer network and determining the first network condition based on the real-time bus communications. For example, the system may continuous monitor bus communications, which are integral to the network's data transmission and management. The system may actively listen to and analyzes these bus communications to capture real-time data about network traffic, packet flow, and any potential bottlenecks or failures. This includes examining the volume of data being transmitted, the speed of the transactions, and any errors or interruptions that occur. By analyzing these parameters, the system can gauge the current operational state of the network, including identifying areas of high congestion or unusual activity that may indicate underlying issues. From this real-time data, the system can determine the current network conditions. For instance, if there is a significant slowdown in bus communications at certain network nodes, this might indicate a high level of congestion or a potential hardware failure. Based on these determinations, the system then generates supplemental signal data.

In some embodiments, generating the first supplemental signal data for the first computer network based on the first network condition may comprise the system determining real-time traffic flow for the first computer network and determining the first network condition based on the real-time traffic flow. For example, the system may continuously capture traffic data from various points across the network. This traffic data may include metrics such as packet rates, bandwidth utilization, latency measurements, and error rates, which provide a detailed and dynamic picture of network activity.

At step 506, process 500 (e.g., using one or more components described above) generates supplemental signal data based on the network condition. For example, the system may generate a first supplemental signal data for the first computer network based on the first network condition. The system may generate a first supplemental signal data for a computer network by engaging in a detailed process that begins with the continuous monitoring of network conditions. The system may collect real-time data on various metrics such as bandwidth usage, latency, packet loss, and throughput, using tools like SNMP, network probes, and traffic analyzers. The collected data is then analyzed to assess the network's performance and identify deviations from normal conditions, such as increased latency or congestion. Based on this analysis, the system may generate supplemental signal data designed to represent any latency in the system. For instance, if excessive latency is detected, the supplemental signal may generate annotated time series data.

In some embodiments, the supplemental signal data may comprise a second stream of data. For example, generating supplemental signal data may comprise the system determining a respective metric corresponding to the first network condition as each time series datum is received and generating a second data stream based on the respective metric. The system may continuously monitor incoming time series data, which could represent various network parameters such as packet transfer rates, latency figures, error rates, or bandwidth usage. Each piece of this time series data provides a snapshot of network performance at a given moment. As each time series datum is received, the system immediately determines a respective metric that corresponds to the current network condition reflected by the data. This metric is a quantifiable measure that could include, for example, the latency experienced by a packet at the time it was logged or the bandwidth usage at a particular node. Based on these metrics, the system generates supplemental signal data. The system then compiles these supplemental signals into a second data stream. This stream is distinct from the primary time series data stream.

At step 508, process 500 (e.g., using one or more components described above) retrieves a control scheme. For example, the system may retrieve a control scheme for interpreting the time series data based on the first supplemental signal data. The control scheme may comprise specific rules that are set to trigger actions based on the characteristics of the supplemental signal data. For instance, if the signal indicates high latency levels, the system may activate routines for buffering incoming data to mitigate the impact of delayed data reception, ensuring that data timestamps remain accurate and synchronized. This buffering helps in maintaining the continuity and accuracy of the time series analysis despite network disruptions. The control scheme may include automatic and/or manual determinations for potential weights, priorities, and/or other adjustments that may be made to generate a vector network.

At step 510, process 500 (e.g., using one or more components described above) uses the control scheme to generate annotated time-series data. For example, the system may use the control scheme to generate annotated time series data based on the time series data. In some embodiments, the system integrates time series data with the supplemental signal data. The supplemental signal data, which reflects network conditions that could impact data transmission (like latency), is crucial for providing context to the raw time series data. The control scheme, equipped with a set of predefined rules and routines, processes this integrated data. These rules dictate how to interpret the time series data under varying conditions suggested by the supplemental signals. For instance, if the supplemental data indicates high latency, the rules might adjust for potential delays in data capture or signal degradation. Based on the interpretations guided by the control scheme, the system annotates the time series data. Annotations may include metrics, values, tags, and/or comments that describe the data quality, context (e.g., "data delayed", "partial data due to high latency"), or specific metrics adjusted for network conditions (like smoothed or interpolated values). The control scheme dynamically adapts the annotation process based on ongoing assessments of network conditions via the supplemental data. If network conditions change, the scheme adjusts the annotations accordingly, ensuring that the annotations always reflect the most accurate interpretation of the data's status. In some embodiments, a feedback loop within the system uses the outcomes of the annotated time series data to refine the rules and routines of the control scheme. By analyzing the effectiveness of previous annotations in aiding data interpretation under specific network conditions, the system continuously improves its accuracy and relevance.

In some embodiments, a system may determine how the time series data is annotated based on its source. For example, the system may determine a first attribute for each datum in the time series data and determine an identifier for the first time source based on the first attribute, wherein the identifier is included in the annotated time series data. As each datum in the time series data is received, the system assesses and determines a first attribute that is crucial for identifying the data's source. This attribute could be something inherent to the data itself, such as its format, content, type, or any metadata that accompanies the data when it is captured. For instance, data coming from a particular sensor might always include specific signatures or metadata formats that differentiate it from data collected through other means. Using the first attribute determined for each datum, the system then identifies the time source or the origin of the data. This step may involve mapping the attribute to a database or a registry where different data sources are cataloged with unique identifiers. For example, if the attribute indicates that the data originates from a specific IoT device, the system references this attribute against a list of known devices to ascertain the precise identifier of the device. With the identifier of the time source established based on the first attribute, the system proceeds to annotate the time series data. This annotation involves adding the identifier to the data, effectively tagging each piece of data with information about its source. This tagging can be direct, where the identifier is appended to the data, or it could be more integrated, such as embedding the identifier within the data's metadata to ensure it remains unobtrusive yet accessible. The inclusion of the identifier in the annotated time series data allows users and downstream systems to easily trace back each datum to its origin. This capability is particularly valuable in complex systems where data is aggregated from multiple sources, as it aids in data verification, error tracing, and more granular analysis. For example, if anomalies are detected in the processed data, the source identifiers can help quickly pinpoint which inputs may need to be scrutinized or recalibrated.

In some embodiments, the system may receive a plurality of supplemental signal data streams and generate a feature input for model based on the plurality of supplemental signal data streams. For example, the system may generate a vector representation based on the first supplemental signal data, the second supplemental signal data, and the third supplemental signal data. The system may generate a feature input for an artificial intelligence model based on the vector representation. For example, the system may input the feature input into the artificial intelligence model and receive an output from the artificial intelligence model, wherein the recommendation is based on the output. In some embodiments, the system may use a 3DQN model, which allows for handling environments with extensive state spaces by replacing traditional Q-learning's tabular approach with a neural network. To mitigate the overestimation bias commonly observed in traditional Q-learning, where values are often predicted to be higher than they actually are, Double Q-Learning employs two separate Q-value estimators. One estimator selects the best action, and the other independently evaluates this action's value, thereby reducing overestimations by decoupling action selection from its evaluation. For example, the output may comprise a prioritized action based on the annotated time series data and a value of the prioritized action.

In some embodiments, using the control scheme to generate the annotated time series data based on the time series data further may comprise the system determining a time stamp corresponding to the time series data and determining a weight to apply to the time stamp based on the first supplemental signal data. For example, each datum in the time series data is assigned a time stamp that precisely marks its occurrence or recording time. The system collects and analyzes supplemental signal data, which provides real-time insights into the network's conditions or other external factors that might influence data accuracy or timing. Based on the insights from the supplemental signal data, the system determines a weight to apply to each time stamp. This weight reflects the reliability or accuracy of the time stamp in the context of the network conditions at the time of data recording. For example, if the supplemental data indicates high network latency, the weight might adjust the time stamp to account for delays, thus correcting or offsetting any discrepancies caused by the latency. The weights are then applied to the respective time stamps, effectively adjusting them to better reflect the true recording times, given the network conditions. This adjustment might involve recalibrating the time stamps to earlier or later values, depending on the nature of the delay or advancement indicated by the network conditions. After adjusting the time stamps, the system annotates the time series data with these newly calibrated time stamps. The annotations include not only the adjusted time stamps but also metadata about the weights applied and the reasons for these adjustments, providing a transparent record of how external conditions affected the data.

In some embodiments, using the control scheme to generate the annotated time series data based on the time series data may comprise the system determining a time stamp corresponding to the time series data and determining a time-shift to apply to the time stamp based on the first supplemental signal data. For example, each data point within the time series is assigned a time stamp. The system gathers supplemental signal data, which reflects the current conditions of the network environment or other relevant external factors. This data can indicate issues like network latency, synchronization errors, or other perturbations that could affect the timing of data capture. Based on the supplemental signal data, the system determines a time-shift for each time stamp. This determination is guided by the nature and extent of the network conditions indicated by the supplemental signals. For instance, if the supplemental data suggests a latency of 200 milliseconds, the system might decide to adjust the time stamps forward or backward by this amount to compensate for the delay introduced by the network latency. The time-shift values are then applied to the respective time stamps. This step adjusts the original time stamps so that they more accurately reflect the real conditions under which the data was recorded, taking into account any delays or advances caused by network issues. After adjusting the time stamps, the system annotates the time series data with these updated time stamps. This annotation process not only includes the adjusted time stamps but also detailed metadata explaining the reason for each adjustment (e.g., the specific network condition that necessitated the time-shift).

In some embodiments, the system may use the control scheme to generate the annotated time series data based on the time series data by determining a time stamp corresponding to the time series data and determining a priority to apply to the time stamp based on the first supplemental signal data. For example, each piece of data in the time series is initially stamped with a time mark that records when the data was captured. The system collects supplemental signal data, which provides insights into the current conditions affecting the network or data collection environment. This may include information on network congestion, delays, or errors that can impact data transmission and recording. The system analyzes the supplemental signal data to determine a priority for each time stamp. This priority reflects the relative importance or reliability of the data at that specific time, influenced by the network conditions recorded by the supplemental data. Priorities are applied to the time stamps to indicate the confidence level or importance of the data points within the broader dataset. This could involve tagging the time stamps with priority levels, such as high, medium, or low, based on the severity and impact of the network conditions at the time of data capture. The system then annotates the time series data with these prioritized time stamps. Each data point in the series includes its time stamp along with metadata that indicates its priority level.

At step 512, process 500 (e.g., using one or more components described above) generates a recommendation. For example, the system may generate a recommendation based on the annotated time series data. Based on the annotated data, recommendation algorithms generate specific advice or actions. These algorithms might consider both the statistical significance of the data patterns and the contextual relevance of the annotations.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one or more of the steps in FIG. 5.

Figure 6:
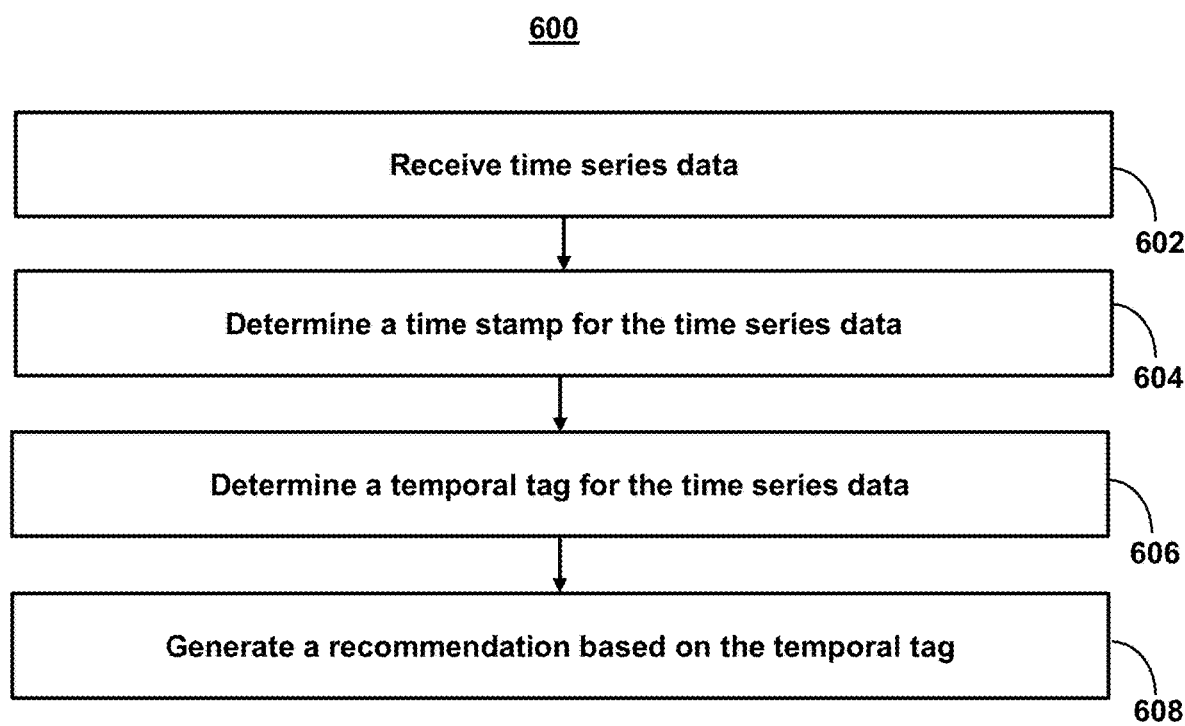
FIG. 6 shows a flowchart for steps involved in generating recommendations based on temporal tags, in accordance with one or more embodiments.

FIG. 6 shows a flowchart for steps involved in generating recommendations based on temporal tags, in accordance with one or more embodiments. For example, process 600 may represent an embodiment in which supplemental signal data is used for temporal embedding. In particular, process 600 may be used to improve the functioning of one or more models. For example, temporal embedding may be used in time series analysis to represent temporal data or sequences of observations as vectors in a high-dimensional space. The goal of temporal embedding is to capture the temporal dependencies and patterns in time series data by embedding each data point along with its temporal context or history into a continuous vector space. As described herein, temporal embeddings may be used for tasks such as time series forecasting, anomaly detection, sequence classification, and event prediction, where capturing temporal dynamics is essential for accurate modeling and prediction.

At step 602, process 600 (e.g., using one or more components described above) receives time series data. For example, the system may receive, at a first computer network, a first data stream comprising time series data, wherein the time series data includes time stamps generated using a first time source. The system may associate a timestamp with each data point in the temporal signal, indicating the exact time at which the signal was sampled or observed. The timestamp may include information such as the date, time of day, and time zone. For example, if the temporal signal represents temperature readings from a sensor, each data point could be tagged with a timestamp indicating the date and time when the temperature measurement was taken. Additionally or alternatively, the system may identify time intervals or segments within the temporal signal that have specific temporal characteristics or relevance. This may involve tagging each segment with metadata indicating the start and end times of the interval, as well as any relevant contextual information. For example, if the temporal signal represents heart rate data collected during exercise sessions, each segment of the signal corresponding to a workout session may be tagged with metadata indicating the start and end times of the session, as well as the type of exercise performed.

At step 604, process 600 (e.g., using one or more components described above) determines a time stamp for the time series data. For example, the system may determine a first network condition for the first computer network, wherein the first network condition comprises a temporal attribute. In some embodiments, the system may determine a first attribute for each datum in the time series data and determine a temporal tag for the first attribute. For example, temporal tags associated with both data and metadata enable efficient organization, retrieval, and analysis of temporal data. They may provide a temporal framework for understanding the timing and temporal relationships within the data, facilitating tasks such as temporal querying, trend analysis, and temporal reasoning. In the context of data, a temporal tag may be associated with each data point, indicating its temporal properties or relevance. For example, in a time-series dataset, each data point may be tagged with a timestamp indicating the time at which it was recorded or observed.

The temporal tag provides a reference point for each data point within the time series, enabling the data to be organized, indexed, and analyzed based on its temporal characteristics. This allows for tasks such as time-series analysis, trend forecasting, and anomaly detection. In addition to tagging individual data points, temporal tags may also be associated with metadata describing the temporal properties of the dataset as a whole. For example, metadata may include information about the time range covered by the dataset, the frequency of data collection or updates, or any relevant temporal constraints or considerations. Temporal metadata may provide contextual information about the temporal characteristics of the dataset, helping users understand the temporal context in which the data was collected or observed. This information is useful for interpreting the data, assessing its reliability, and determining its suitability for specific analysis tasks. By embedding priority and secondary temporal tags into signal processing systems and algorithms, the model may prioritize and process signals based on their temporal relevance and importance, leading to more efficient, adaptive, and contextually aware signal processing.

At step 606, process 600 (e.g., using one or more components described above) determines a temporal tag for the time series data. For example, the system may generate a first supplemental signal data for the first computer network based on the first network condition. In some embodiments, generating the first supplemental signal data for the first computer network based on the first network condition may comprise the system generating a temporal embedding based on the first network condition and generating a feature input for a Retrieval-Augmented Generation and Retrieval-Augmented Understanding models. For example, temporal embedding represents temporal information and patterns in a lower-dimensional space, allowing models to capture temporal dynamics and trends in the input text and retrieved context. By incorporating temporal embedding into the model architecture, models may consider how information evolves over time and make contextually relevant predictions or responses based on temporal context. Temporal embedding may help contextualize information retrieval by capturing the temporal relevance of retrieved context to the input text. Models may use temporal embedding to prioritize recent or temporally relevant information from external knowledge sources, ensuring that the retrieved context is up-to-date and contextually appropriate for the input query or text. Temporal embedding enables models to perform temporal reasoning by understanding the sequence of events, actions, or changes described in the input text and retrieved context. By embedding temporal information into the model representation, the model may infer causal relationships, predict future events, and make contextually informed decisions based on the temporal context provided by the input text and retrieved information. Temporal embedding also helps models adapt to time-varying data and changing contexts by encoding temporal features and trends into the model representation. Models may use temporal embedding to track changes in the input text and retrieved context over time, ensuring that the model's responses remain relevant and accurate as the underlying data evolves.

At step 608, process 600 (e.g., using one or more components described above) generates a recommendation based on the temporal tag. For example, the system may retrieve a control scheme for interpreting the time series data based on the first supplemental signal data. The system may use the control scheme to generate annotated time series data based on the time series data. The system may then generate a recommendation based on the annotated time series data.

In some embodiments, wherein using the control scheme to generate the annotated time series data based on the time series data may comprise the system determining a temporal relevance of data in the time series data and encoding the temporal relevance in the annotated time series data. In some embodiments, generating the first supplemental signal data for the first computer network based on the first network condition may comprise the system determining a temporal relevance based on the first network condition, wherein the control scheme determines a temporal relevance score based on the temporal relevance.

In some embodiments, the recommendation based be used for improved search. For example, search engines may prioritize search results based on their temporal relevance to the user's query. Temporal tags associated with documents or web pages indicate their publication date or last update time, allowing search engines to rank newer or more recently updated content higher in search results. For example, when a user searches for news or current events topics, search engines may prioritize recent articles or blog posts that provide up-to-date information. Search engines may provide temporal filters or options that allow users to refine search results based on specific time ranges or intervals. Temporal tags associated with search results enable users to filter results by hours, days, months, or custom date ranges to find information that is temporally relevant to their needs. For example, users can choose to filter search results to view only content published within the past week or month to find the latest information on a topic. Temporal tags may provide contextual information about the timing and temporal context of search results. Search engines may use this information to present search results in a way that reflects their temporal relevance or significance. For example, search engines may highlight search results that are trending or receiving increased attention within a specific time period, helping users identify timely and relevant content.

In some embodiments, the system recommendations may be used for meta-forecasting. In meta-forecasting, features or predictors are typically derived from characteristics of the forecasting models themselves, as well as properties of the data being forecasted. Model-specific features may include parameters, hyperparameters, architecture, training duration, optimization algorithms, and more. Data-specific features may include trend, seasonality, periodicity, volatility, autocorrelation, stationarity, and other properties of the time series data. Temporal embedding may allow for meta-forecasting providing a systematic framework for assessing and comparing the performance of forecasting models, enabling more informed decision-making and improving the quality of forecasts in various applications. Meta-forecasting involves predicting how well a given forecasting model or method may perform in forecasting future data or events. Meta-forecasting may be applied to various types of forecasting models, including time series forecasting models, machine learning models, and/or statistical models. Meta-forecasting may be used where forecasting plays a critical role, including finance, economics, supply chain management, energy forecasting, weather forecasting, and more such as by forecasters, analysts, researchers, and decision-makers to evaluate the performance of forecasting models, select appropriate models for specific tasks, and improve forecasting accuracy and reliability. Temporal embedding may facilitate meta-forecasting by providing a framework for representing temporal data in a high-dimensional space, which may be leveraged to assess the performance of forecasting models across different datasets, time periods, or conditions. Temporal embedding provides a powerful framework for representing and extracting features from time series data, which may be leveraged to enable meta-forecasting by predicting the performance of forecasting models across different contexts and scenarios. By embedding time series data into a high-dimensional feature space, temporal embedding facilitates the evaluation, comparison, and selection of forecasting models, leading to more accurate and reliable forecasts in diverse applications.

In some embodiments, the recommendation may be used for databases operations. For example, temporal tags in databases, may enhance the temporal context and relevance of the data stored within the database, enabling more effective management, retrieval, analysis, and interpretation of temporal data. The system may use temporal tags to filter and query database records based on specific time ranges or intervals. Temporal filtering enables the system to retrieve data that is relevant to a particular time period or temporal context. For example, the system may query a sales database to retrieve all orders placed within the past week or month, using temporal tags to specify the desired time range for the query. Additionally, the system may implement temporal versioning in the database to maintain a history of changes to data over time. Temporal tags may be used to track and record each version of a record, allowing the system to trace back to previous states of the data. For example, in a document management system, each document record may be tagged with timestamps indicating when the document was created, modified, or deleted, along with a history of changes. The system may apply temporal constraints and validity periods to database records to indicate the time periods during which the data is considered valid or applicable. Temporal tags maybe used to enforce temporal constraints and ensure data integrity. For example, in a product catalog database, each product record may be tagged with validity dates indicating when the product is available for sale, allowing the system to enforce restrictions on product availability.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-4 could be used to perform one or more of the steps in FIG. 6.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques may be better understood with reference to the following enumerated embodiments:

1. A method for mitigating time synchronization latency in computer networks and/or temporal tag embedding for dynamic information retrieval, meta-forecasting, and/or signal processing.
2. The method of the preceding embodiment, further comprising: receiving, at a first computer network, a first data stream comprising time series data, wherein the time series data includes time stamps generated using a first time source; determining a first network condition for the first computer network; generating a first supplemental signal data for the first computer network based on the first network condition; retrieving a control scheme for interpreting the time series data based on the first supplemental signal data; using the control scheme to generate annotated time series data based on the time series data; and generating a recommendation based on the annotated time series data.
3. The method of any one of the preceding embodiments, wherein generating the first supplemental signal data for the first computer network based on the first network condition further comprises: determining historical traffic data for the first computer network; and determining the first network condition based on the historical traffic data.
4. The method of any one of the preceding embodiments, wherein generating the first supplemental signal data for the first computer network based on the first network condition further comprises: detecting real-time bus communications for the first computer network; and determining the first network condition based on the real-time bus communications.
5. The method of any one of the preceding embodiments, wherein generating the first supplemental signal data for the first computer network based on the first network condition further comprises: determining real-time traffic flow for the first computer network; and determining the first network condition based on the real-time traffic flow.
6. The method of any one of the preceding embodiments, further comprising: determining a respective metric corresponding to the first network condition as each time series datum is received; and generating a second data stream based on the respective metric.
7. The method of any one of the preceding embodiments, further comprising: determining a first attribute for each datum in the time series data; and determining an identifier for the first time source based on the first attribute, wherein the identifier is included in the annotated time series data.
8. The method of any one of the preceding embodiments, further comprising: generating a second supplemental signal data for the first computer network based on a second network condition; and generating a third supplemental signal data for the first computer network based on a third network condition.
9. The method of any one of the preceding embodiments, further comprising: generating a vector representation based on the first supplemental signal data, the second supplemental signal data, and the third supplemental signal data; and generating a feature input for an artificial intelligence model based on the vector representation.
10. The method of any one of the preceding embodiments, wherein generating the recommendation based on the annotated time series data further comprising: inputting the feature input into the artificial intelligence model; and receiving an output from the artificial intelligence model, wherein the recommendation is based on the output.
11. The method of any one of the preceding embodiments, wherein the output comprises: an prioritized action based on the annotated time series data; and a value of the prioritized action.
12. The method of any one of the preceding embodiments, wherein using the control scheme to generate the annotated time series data based on the time series data further comprises: determining a time stamp corresponding to the time series data; and determining a weight to apply to the time stamp based on the first supplemental signal data.
13. The method of any one of the preceding embodiments, wherein using the control scheme to generate the annotated time series data based on the time series data further comprises: determining a time stamp corresponding to the time series data; and determining a time-shift to apply to the time stamp based on the first supplemental signal data.
14. The method of any one of the preceding embodiments, wherein using the control scheme to generate the annotated time series data based on the time series data further comprises: determining a time stamp corresponding to the time series data; and determining a priority to apply to the time stamp based on the first supplemental signal data.

15. The method of any one of the preceding embodiments, wherein generating the first supplemental signal data for the first computer network based on the first network condition further comprises: generating a temporal embedding based on the first network condition; and generating a feature input for a Retrieval-Augmented Generation model or a Retrieval-Augmented Understanding model.

16. The method of any one of the preceding embodiments, wherein using the control scheme to generate the annotated time series data based on the time series data further comprises: determining a temporal relevance of data in the time series data; and encoding the temporal relevance in the annotated time series data.

17. The method of any one of the preceding embodiments, wherein generating the first supplemental signal data for the first computer network based on the first network condition further comprises determining a temporal relevance based on the first network condition, wherein the control scheme determines a temporal relevance score based on the temporal relevance.

18. The method of any one of the preceding embodiments, wherein generating the first supplemental signal data for the first computer network based on the first network condition further comprises: determining a first attribute for each datum in the time series data; and determining a temporal tag for the first attribute.

19. One or more non-transitory, computer-readable media storing instructions that, when executed by a data processing apparatus, cause the data processing apparatus to perform operations comprising those of any of embodiments 1-18.

20. A system comprising one or more processors; and memory storing instructions that, when executed by the processors, cause the processors to effectuate operations comprising those of any of embodiments 1-18.

21. A system comprising means for performing any of embodiments 1-18.

What is claimed is:

1. A system for mitigating time synchronization latency in computer networks, the system comprising:
one or more processors; and
one or more non-transitory, computer-readable media comprising instructions that when executed by the one or more processors cause operations comprising:
receiving, at a first computer network, a first data stream comprising time series data, wherein the time series data includes time stamps generated using a first time source;
determining, a plurality of network conditions, for the first computer network;
generating first supplemental signal data for the first computer network based on a first network condition of the plurality of network conditions, wherein the first supplemental signal data comprise a passive priority signal;
generating second supplemental signal data for the first computer network based on a second network condition of the plurality of network conditions, wherein the second supplemental signal data comprise an active priority signal;
generating third supplemental signal data for the first computer network based on a first network condition of the plurality of network conditions, wherein the first supplemental signal data comprise an adaptive priority signal;
retrieving a control scheme for interpreting the time stamps generated using the first time source based on the first supplemental signal data, second supplemental data, and third supplemental data;
using the control scheme to generate annotated time series data based on the time series data, wherein each time series datum of the annotated time series data comprises a weight assigned by the control scheme; and
generating a recommendation based on the annotated time series data.

2. A method for mitigating time synchronization latency in computer networks, the method comprising:
receiving, at a first computer network, a first data stream comprising time series data, wherein the time series data includes time stamps generated using a first time source;
determining a first network condition for the first computer network;
generating a first supplemental signal data for the first computer network based on the first network condition;
retrieving a control scheme for interpreting the time series data based on the first supplemental signal data;
using the control scheme to generate annotated time series data based on the time series data; and
generating a recommendation based on the annotated time series data.

3. The method of claim 2, wherein generating the first supplemental signal data for the first computer network based on the first network condition further comprises:
determining historical traffic data for the first computer network; and
determining the first network condition based on the historical traffic data.

4. The method of claim 2, wherein generating the first supplemental signal data for the first computer network based on the first network condition further comprises:
detecting real-time bus communications for the first computer network; and
determining the first network condition based on the real-time bus communications.

5. The method of claim 2, wherein generating the first supplemental signal data for the first computer network based on the first network condition further comprises:
determining real-time traffic flow for the first computer network; and
determining the first network condition based on the real-time traffic flow.

6. The method of claim 2, further comprising:
determining a respective metric corresponding to the first network condition as each time series datum is received; and
generating a second data stream based on the respective metric.

7. The method of claim 2, further comprising:
determining a first attribute for each datum in the time series data; and
determining an identifier for the first time source based on the first attribute, wherein the identifier is included in the annotated time series data.

8. The method of claim 2, further comprising:
generating a second supplemental signal data for the first computer network based on a second network condition; and generating a third supplemental signal data for the first computer network based on a third network condition.

9. The method of claim 8, further comprising:
generating a vector representation based on the first supplemental signal data, the second supplemental signal data, and the third supplemental signal data; and
generating a feature input for an artificial intelligence model based on the vector representation.

10. The method of claim 9, wherein generating the recommendation based on the annotated time series data further comprising:
inputting the feature input into the artificial intelligence model; and
receiving an output from the artificial intelligence model, wherein the recommendation is based on the output.

11. The method of claim 10, wherein the output comprises:
a prioritized action based on the annotated time series data; and
a value of the prioritized action.

12. The method of claim 2, wherein using the control scheme to generate the annotated time series data based on the time series data further comprises:
determining a time stamp corresponding to the time series data; and
determining a weight to apply to the time stamp based on the first supplemental signal data.

13. The method of claim 2, wherein using the control scheme to generate the annotated time series data based on the time series data further comprises:
determining a time stamp corresponding to the time series data; and
determining a time-shift to apply to the time stamp based on the first supplemental signal data.

14. The method of claim 2, wherein using the control scheme to generate the annotated time series data based on the time series data further comprises:
determining a time stamp corresponding to the time series data; and
determining a priority to apply to the time stamp based on the first supplemental signal data.

15. One or more non-transitory, computer-readable media comprising instructions that when executed by one or more processors cause operations comprising:
receiving, at a first computer network, a first data stream comprising time series data, wherein the time series data includes time stamps generated using a first time source;
determining a first network condition for the first computer network, wherein the first network condition comprises a temporal attribute;
generating a first supplemental signal data for the first computer network based on the first network condition;
retrieving a control scheme for interpreting the time series data based on the first supplemental signal data;
using the control scheme to generate annotated time series data based on the time series data; and
generating a recommendation based on the annotated time series data.

16. The one or more non-transitory, computer-readable media of claim 15, wherein generating the first supplemental signal data for the first computer network based on the first network condition further comprises:
generating a temporal embedding based on the first network condition; and
generating a feature input for a Retrieval-Augmented Generation model or a Retrieval-Augmented Understanding model.

17. The one or more non-transitory, computer-readable media of claim 15, wherein generating the first supplemental signal data for the first computer network based on the first network condition further comprises determining a temporal relevance based on the first network condition, wherein the control scheme determines a temporal relevance score based on the temporal relevance.

18. The one or more non-transitory, computer-readable media of claim 15, using the control scheme to generate the annotated time series data based on the time series data further comprises:
determining a temporal relevance of data in the time series data; and
encoding the temporal relevance in the annotated time series data.

19. The one or more non-transitory, computer-readable media of claim 15, generating a recommendation based on the annotated time series data further comprises:
determining an embedded temporal tag in the annotated time series data; and
prioritizing the annotated time series data based on the embedded temporal tag.

20. The one or more non-transitory, computer-readable media of claim 15, wherein generating the first supplemental signal data for the first computer network based on the first network condition further comprises:
determining a first attribute for each datum in the time series data; and
determining a temporal tag for the first attribute.

* * * * *